(12) United States Patent
Schoeny et al.

(10) Patent No.: US 10,820,488 B2
(45) Date of Patent: Nov. 3, 2020

(54) SYSTEMS AND METHODS FOR MONITORING THE OPERATION OF A SEED METER

(71) Applicant: CNH Industrial America LLC, New Holland, PA (US)

(72) Inventors: Christopher Schoeny, Yorkville, IL (US); Chad M. Johnson, Arlington, IL (US)

(73) Assignee: CNH Industrial America LLC, New Holland, PA (US)

( * ) Notice: Subject to any disclaimer, the term of this patent is extended or adjusted under 35 U.S.C. 154(b) by 369 days.

(21) Appl. No.: 15/923,082

(22) Filed: Mar. 16, 2018

(65) Prior Publication Data

US 2019/0281759 A1 Sep. 19, 2019

(51) Int. Cl.
*A01C 7/10* (2006.01)

(52) U.S. Cl.
CPC .................................... *A01C 7/105* (2013.01)

(58) Field of Classification Search
CPC ........... A01C 7/105; A01C 7/102; A01C 7/10; A01C 7/08; A01C 7/00
See application file for complete search history.

(56) References Cited

U.S. PATENT DOCUMENTS

| | | | |
|---|---|---|---|
| 5,253,534 A | 10/1993 | Hamilton, Jr. | |
| 5,915,313 A | 6/1999 | Bender et al. | |
| 5,963,139 A | 10/1999 | Littke | |
| 6,527,205 B2 | 3/2003 | Anderson et al. | |
| 6,845,724 B2 | 1/2005 | Mayerie et al. | |
| 7,478,603 B2 | 1/2009 | Riewerts et al. | |
| 7,726,251 B1 | 6/2010 | Peterson et al. | |
| 7,938,075 B1 | 5/2011 | Glendenning et al. | |
| 8,408,478 B2 | 4/2013 | Wonderlich | |
| 8,543,238 B2 | 9/2013 | Straeter | |

(Continued)

FOREIGN PATENT DOCUMENTS

| | | |
|---|---|---|
| CA | 2311698 | 12/2001 |
| DE | 102011010100 | 8/2012 |
| WO | WO 2017/011355 | 1/2017 |

OTHER PUBLICATIONS

John Deere/US "Spacing and Singulation" www.deere.com Dated Feb. 9, 2017 (3 pages).

(Continued)

*Primary Examiner* — Christopher J. Novosad
(74) *Attorney, Agent, or Firm* — Rebecca L. Henkel; Rickard K. DeMille

(57) ABSTRACT

In one aspect, a method for monitoring seed meter operation may include operating a seed meter such that seeds are transported by a seed transport member of the seed meter from a seed acquisition region to a separate location for subsequent discharge from the seed meter. In addition, the method may include receiving an index signal from a sensor located within a portion of the seed meter across which an air pressure differential exists to allow seeds to be transported by the seed transport member and receiving a timing signal associated with an extent to which the seed transport member has been rotated within the seed meter following receipt of the index signal. The method may also include evaluating data from the sensor based on the timing signal to identify at least one of the presence or absence of a seed within the one or more seeds cells of the seed transport member.

20 Claims, 11 Drawing Sheets

(56) References Cited

U.S. PATENT DOCUMENTS

| | | | |
|---|---|---|---|
| 8,695,396 B2 | 4/2014 | Landphair et al. |
| 8,925,471 B2 | 1/2015 | Adams et al. |
| 8,942,896 B2 | 1/2015 | Mayerle |
| 8,948,980 B2 | 2/2015 | Garner et al. |
| 9,043,949 B2 | 6/2015 | Liu |
| 9,179,594 B2 | 11/2015 | Graham |
| 9,237,687 B2 | 1/2016 | Sauder et al. |
| 9,360,121 B2 | 6/2016 | Garner et al. |
| 9,426,940 B2 | 8/2016 | Connors et al. |
| 9,481,294 B2 | 11/2016 | Sauder et al. |
| 9,491,901 B2 | 11/2016 | Genteil |
| 9,585,303 B2 | 3/2017 | Rylander |
| 9,596,803 B2 | 3/2017 | Wendte et al. |
| 9,603,299 B2 | 3/2017 | Wendte et al. |
| 9,622,402 B2 | 4/2017 | Kinzenbaw et al. |
| 2012/0226461 A1 | 9/2012 | Kowalchuk |
| 2014/0277959 A1 | 9/2014 | Wagers et al. |
| 2015/0156964 A1 | 6/2015 | Krohn et al. |
| 2015/0195988 A1 | 7/2015 | Radtke et al. |
| 2015/0216107 A1 | 8/2015 | Wendte et al. |
| 2015/0223391 A1 | 8/2015 | Wendte et al. |
| 2015/0351314 A1 | 12/2015 | Sauder et al. |
| 2016/0037713 A1 | 2/2016 | Wendte et al. |
| 2016/0050842 A1 | 2/2016 | Sauder et al. |
| 2016/0143212 A1 | 5/2016 | Wendte et al. |
| 2016/0249525 A1 | 9/2016 | Baurer et al. |
| 2016/0255766 A1 | 9/2016 | Assy et al. |
| 2016/0302353 A1 | 10/2016 | Wendte et al. |

OTHER PUBLICATIONS

Case IH "Precision Disk™ 500T Air Drill" www.caseih.com Dated Feb. 9, 2017 (23 pages).

Kinze Vision "Planter Control System Display Operator Manual" Jsrepair.com Dated Jun. 2008 (194 pages).

Elsevier S. Kamgar, F. Noel-Khodabadi and S.M. Shafaei. "Design, Development and Field Assessment of a Controlled Seed Metering Unit to be Used in Grain Drills for Direct Seeding of Wheat" Information Processing in Agriculture 2 (2015) 169-176 Available at www.sciencedirect.com Journal Homepage: www.elsevier.com/locate/inpa (14 pages).

Precision Planting LLC 20/20 SeedSense www.precisionplanting.com Dated: 2017 (6 pages).

Kinze 4900 Multi-Hybrid Planter Dated Apr. 28, 2014 (5 pages) http://www.kinze.com/planter.aspx?id=4936fa23-aef1-423b-98dc-e612ffcc17af&name=4900+multi-hybrid+planter.

ESET Space Precisely Harvest More Dated Apr. 28, 2017 (4 pages) http://www.precisionplanting.com/#products/eset/.

SYSTEMS AND METHODS FOR MONITORING THE OPERATION OF A SEED METER

FIELD OF THE INVENTION

The present subject matter relates generally to seed meters and, more particularly, to systems and methods for monitoring the operation of a seed meter, such as a multi-variety seed meter, using one or more timing signals to evaluate data received from one or more sensors located within the seed meter.

BACKGROUND OF THE INVENTION

A seed meter carried on a row unit of a planting implement dispenses seed and includes a seed transport member in which an array of seed cells is defined around the outer perimeter region thereof. As the seed transport member rotates within the housing of the seed meter, each individual seed cell completes repeated rotations around the housing of the seed meter. During each rotation, each particular seed cell will pass through different regions of the seed meter. When passing through the seed pool of the seed meter, each seed cell typically acquires at least one seed during normal operation of the seed meter.

It is known to draw inferences about the operational status of a seed meter by using a sensor that detects when each seed is dropped through a seed tube provided in operative association with the seed meter. However, the data from seed tube sensors is often unreliable and may not provide an accurate representation of what is actually occurring within the seed meter. To address the issues associated with seed tube sensors, attempts have been made to place a sensor within the interior of a seed meter to monitor its operational status. However, based on the placement of the sensor within the seed meter, the sensor may be subject to soiling (e.g., due to dust buildup from the seeds), which may impact the accuracy of the sensor data derived therefrom. Moreover, depending on the type and/or resolution of the sensor utilized within the seed meter, the sensor may not be capable of accurately detecting certain operating parameters associated with the seed meter, such as whether seeds are being consistently acquired by the seed cells as the seed transport member is rotated through the meter's seed pool.

Accordingly, an improved system and method for monitoring seed meter operation that utilizes one or more timing signals to evaluate data received from one or more sensors located within the seed meter in a manner that enhances the accuracy and/or reliability of the resulting data would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for monitoring seed meter operation. The method may include operating a seed meter such that seeds contained within a seed acquisition region of the seed meter are transported by a seed transport member of the seed meter from the seed acquisition region to a separate location for subsequent discharge from the seed meter. In addition, the method may include receiving, with a computing device, an index signal from a sensor located within a portion of the seed meter across which an air pressure differential exists to allow seeds to be transported by the seed transport member, the index signal providing an indication of a current position of one or more seed cells of the seed transport member relative to the sensor. Moreover, the method may include receiving, with the computing device, a timing signal associated with an extent to which the seed transport member has been rotated within the seed meter following receipt of the index signal, and evaluating, with the computing device, data from the sensor based on the timing signal to identify at least one of the presence or absence of a seed within the one or more seed cells of the seed transport member.

In another aspect, the present subject matter is directed to a method for monitoring seed meter operation. The method may include operating a seed meter such that seeds contained within a seed acquisition region of the seed meter are transported by a seed transport member of the seed meter from the seed acquisition region to a separate location for subsequent discharge from the seed meter, wherein the seed transport member defines a first array of seed cells and a second array of seed cells spaced radially from the first array of seed cells. In addition, the method may include receiving, with a computing device, a timing signal providing an indication of an instance at which a seed cell of at least one of the first array of seed cells or the second array of seed cells will pass a given location within the seed meter, and sequentially activating, with the computing device, first and second sensors located within the seed meter based on the timing signal to capture data associated with the first and second arrays of seed cells, wherein the first sensor is configured to detect at least one of the presence or absence of seeds within the first array of seed cells and the second sensor is configured to detect at least one of the presence or absence of seeds within the second array of seed cells.

In a further aspect, the present subject matter is directed to a system for monitoring seed meter operation. The system may include a seed meter having a seed transport member configured to transport seeds contained within the seed meter from a seed acquisition region of the seed meter to a separate location for subsequent discharge from the seed meter. The seed transport member defines a first array of seed cells and a second array of seed cells spaced radially from the first array of seed cells. The system also includes a first sensor having a detection zone through which at least one of seed cells of the first array of seed cells or seeds carried by the seed cells of the first array of seed cells pass with rotation of the seed transport member, with the first sensor being configured to detect the presence or absence of seeds within the seed cells of the first array of seed cells. Additionally, the system includes a second sensor having a detection zone through which at least one of seed cells of the second array of seed cells or seeds carried by the seed cells of the second array of seed cells pass with rotation of the seed transport member, with the second sensor being configured to detect the presence or absence of seeds within the seed cells of the second array of seed cells. Moreover, the system includes a controller communicatively coupled to the first and second sensors. The controller may be configured to sequentially activate the first and second sensors to collect data associated with the presence or absence of seeds within the seed cells of the first and second arrays of seed cells.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
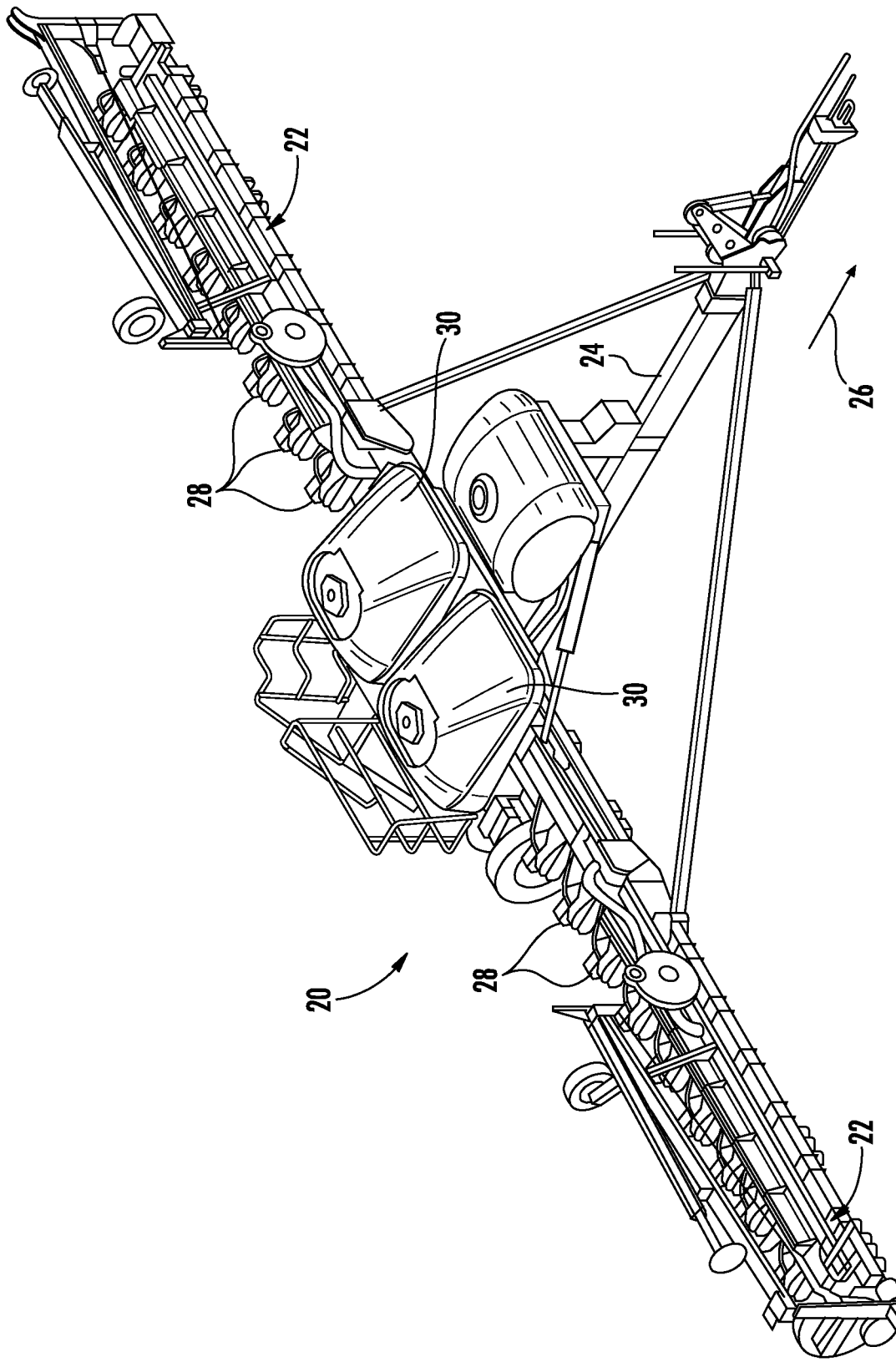
FIG. 1 illustrates a perspective view of one embodiment of a planter in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring the operation of a seed meter. Specifically, in several embodiments, the disclosed system includes a controller communicatively coupled to one or more sensors located within the seed meter that are configured to detect the presence or absence of seeds within the seed cells of a seed transport member of the seed meter. Additionally, in accordance with aspects of the present subject matter, the controller may be configured to rely on a timing signal(s) that provides the controller with an input for determining when to sample and/or evaluate data received from the sensor(s). For example, in one embodiment, the controller may be configured to receive one or more timing signals from a "timing" sensor that provide an indication of the instance or moment at which seeds cells are passing a given location within the seed meter (e.g., the location of the timing sensor) and/or an indication of the extent to which the seed transport member has been rotated within the seed meter. Based on such timing signals, the controller may be configured to determine when a given seed cell will be passing through the detection zone(s) of one or more of the sensors located within the seed meter. The controller may then be configured to sample and/or evaluate the data received from such sensor(s) at the instance at which a seed cell is passing by the sensor's location (or across a discrete sampling period including such instance) to determine whether a seed was present or absent within the passing seed cell.

Referring now to drawings, FIG. 1 illustrates a perspective view of one embodiment of a planting implement or planter 20 in accordance with aspects of the present subject matter. As shown in FIG. 1, the planter 20 may include a laterally extending toolbar or frame assembly 22 connected at its middle to a forwardly extending tow bar 24 to allow the planter 20 to be towed by a work vehicle (not shown), such as an agricultural tractor, in a direction of travel (e.g., as indicated by arrow 26). The frame assembly 22 may generally be configured to support a plurality of seed planting units (or row units) 28. As is generally understood, each row unit 28 may be configured to deposit seeds at a desired depth beneath the soil surface and at a desired seed spacing as the planter 20 is being towed by the work vehicle, thereby establishing rows of planted seeds. In some embodiments, the bulk of the seeds to be planted may be stored in one or more seed tanks 30. Thus, as seeds are planted by the row units 28, a pneumatic distribution system may distribute additional seeds from the seed tanks 30 to the individual row units 28. Additionally, as will be described below, each row unit 28 may also include one or more individual seed hoppers for locally storing seeds at the row unit 28.

It should be appreciated that, for purposes of illustration, only a portion of the row units 28 of the planter 20 have been shown in FIG. 1. In general, the planter 20 may include any number of row units 28, such as 6, 8, 12, 16, 24, 32, or 36 row units. In addition, it should be appreciated that the lateral spacing between row units 28 may be selected based on the type of crop being planted. For example, the row units 28 may be spaced approximately 30 inches from one another for planting corn, and approximately 15 inches from one another for planting soybeans.

It should also be appreciated that the configuration of the planter 20 described above and shown in FIG. 1 is provided only to place the present subject matter in an exemplary field of use. Thus, it should be appreciated that the present subject matter may be readily adaptable to any manner of planter configuration.

Figure 2:
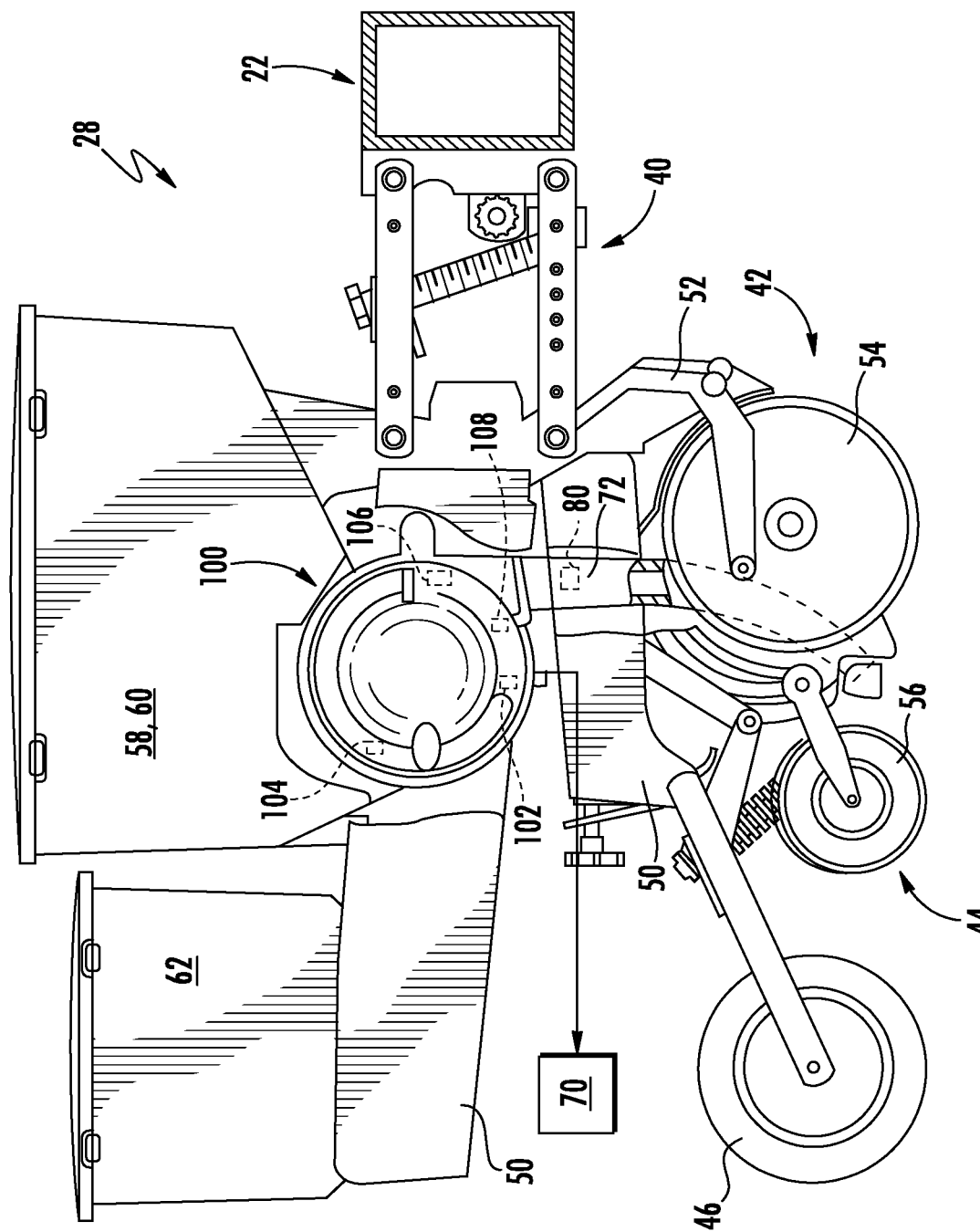
FIG. 2 illustrates a side view of one embodiment of a row unit suitable for use with a planter in accordance with aspects of the present subject matter.

Referring now to FIG. 2, a side view of one embodiment of a row unit 28 is illustrated in accordance with aspects of the present subject matter. As shown, the row unit 28 includes a linkage assembly 40 configured to mount the row unit 28 to the toolbar or frame assembly 22 of the planter 20. As shown in FIG. 2, the row unit 28 also includes a furrow opening assembly 42, a furrow closing assembly 44, and a press wheel 46. In general, the furrow opening assembly 42 may include a gauge wheel (not shown) operatively connected to a frame 50 of the row unit 28 via a support arm 52. Additionally, the opening assembly 42 may also include one or more opening disks 54 configured to excavate a furrow, or trench, in the soil. As is generally understood, the gauge wheel may be configured to engage the surface of the field, with the height of the opening disk(s) 54 being adjusted with respect to the position of the gauge wheel to set the desired depth of the furrow being excavated. Moreover, as shown, the furrow closing assembly 44 may include a closing disk(s) 56 configured to close the furrow after seeds have been deposited into the furrow. The press wheel 46 may then be configured to roll over the closed furrow to firm the soil over the seed and promote favorable seed-to-soil contact.

Additionally, as shown in FIG. 2, the row unit 28 may include one or more seed hoppers 58, 60 and, optionally, a granular chemical product hopper 62 supported on the frame 50. In general, the seed hopper(s) 58, 60 may be configured to store seeds to be gravitationally deposited within the furrow as the row unit 28 moves over and across the field. For instance, in one embodiment, the row unit 28 may include a first seed hopper 58 configured to store seeds 64 (FIG. 3) of a first seed type and a second hopper 60 configured to store seeds 66 (FIG. 3) of a second seed type. In another embodiment, the row unit 28 may include more than two seed hoppers, with each seed hopper storing a different seed type. Alternatively, a single seed hopper may be used to store more than one type of seed. For example, a single seed hopper may be internally divided (e.g., via a divider wall(s)) so as to define separate seed chambers or compartments for storing differing seed types.

Moreover, the row unit 28 may include a seed meter 100 provided in operative association with the seed hopper(s) 58, 60. In general, the seed meter 100 may be configured to uniformly release seeds received from the seed hopper(s) 58, 60 for deposit within the furrow. For instance, the seed meter 100 may be coupled to a suitable vacuum source 70 (e.g., a blower powered by a motor and associated tubing or hoses) configured to generate a vacuum or negative pressure that attaches the seeds to a rotating seed transport member (e.g., a seed disk) of the seed meter 100, which controls the rate at which the seeds are output from the seed meter 100 to an associated seed tube 72 (or other seed delivery mechanism). As shown in FIG. 2, the seed tube 72 may extend vertically between the seed meter 100 and the ground to facilitate delivery of the seeds output from the seed meter 100 to the furrow.

Additionally, one or more sensors may be provided in operative association with the seed meter 100 for monitoring one or more operating parameters of the seed meter 100. For instance, as will be described in greater detail below, the seed meter 100 may include one or more seed pool sensors 102, pre-singulation sensors 104, post-singulation sensors 106, and/or post-delivery sensors 108 for monitoring one or more parameters associated with the operation of the seed meter 100. In addition, the seed meter 100 may also include or be provided in operative association with one or more additional sensors, such as a position sensor(s) (not shown in FIG. 2) for monitoring the rotation and/or rotational position of the seed transport member within the seed meter 100. Moreover, a seed delivery sensor 80 may be provided in operative association with the seed tube 72 (or other seed delivery mechanism) for monitoring the seeds falling or being transported through the seed tube 72 (or other seed delivery mechanism) after being discharged from the seed meter 100.

It should be appreciated that the configuration of the row unit 28 described above and shown in FIG. 2 is provided only to place the present subject matter in an exemplary field of use. Thus, it should be appreciated that the present subject matter may be readily adaptable to any manner of row unit configuration.

Figure 3:
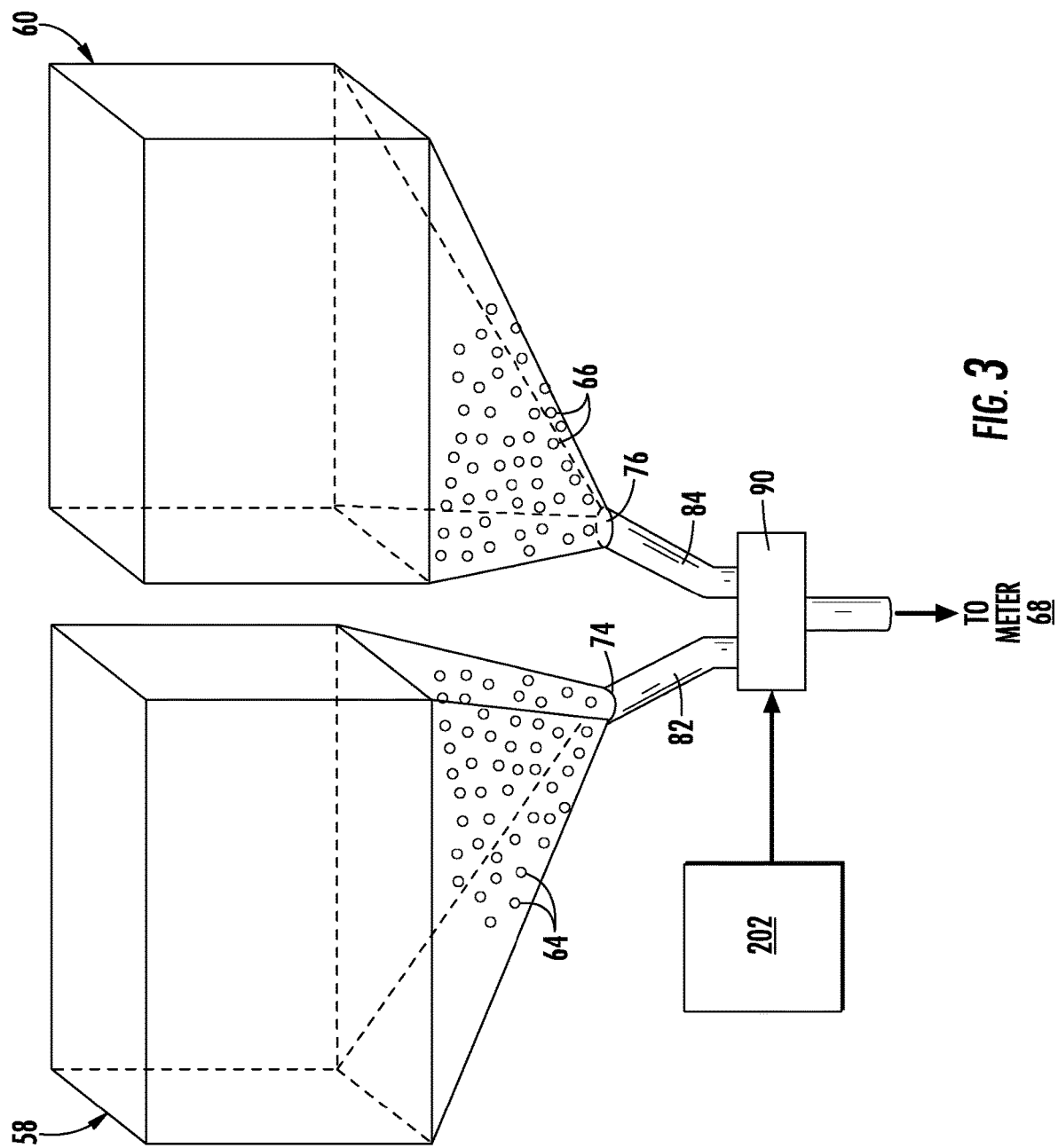
FIG. 3 illustrates a seed supply arrangement for supplying seeds of differing types to a seed meter in accordance with aspects of the present subject matter.

Referring now to FIG. 3, a schematic view of one embodiment of seed supply arrangement for supplying different types of seeds to the seed meter 100 of a row unit 28 is illustrated in accordance with aspects of the present subject matter. As shown, the first and second seed hoppers 58, 60 of the row unit 28 may each include a respective seed discharge outlet 74, 76, with each seed discharge outlet 74, 76 feeding into a respective input conduit 82, 84 in flow communication with a seed supply device 90. In general, the seed supply device 90 may correspond to any suitable device or mechanism (including any combination of devices or mechanisms) configured to regulate the supply of seeds 64, 66 from the first and second seed hoppers 58, 60 to the seed meter 100. For instance, as indicated above, seeds 64 of a first seed type may be stored within the first seed hopper 58 while seeds 66 of a second seed type may be stored within the second seed hopper 60. In such an embodiment, the seed supply device 90 may be configured to control the flow of seeds 64, 66 to the seed meter 100 based on the desired or selected seed type to be planted. For instance, when it is desired to supply seeds 64 of the first seed type to the seed meter 100, the seed supply device 90 may block the flow of seeds 66 through the input conduit 84 associated with the second seed hopper 60 while allowing seeds 64 from the first seed hopper 58 to flow through its associated input conduit 82 and be supplied to the seed meter 100. Similarly, when it is desired to supply seeds 66 of the second seed type to the seed meter 100, the seed supply device 90 may block the flow of seeds 64 through the input conduit 82 associated with the first seed hopper 58 while allowing seeds 66 from the second seed hopper 60 to flow through its associated input conduit 84 and be supplied to the seed meter 100.

It should be appreciated that, in one embodiment, the seed supply device 90 may correspond to one or more control valves configured to regulate the supply of seeds 64, 66 to the seed meter 100. For example, in one embodiment, a single control valve may be used that is configured to be selectively actuated between a first position in which seeds 64 of the first seed type are supplied from the first seed hopper 58 to the seed meter 100, a second position in which seeds 66 of the second type are supplied from the second seed hopper 60 to the seed meter 100, and a third position in which the control valve(s) stops the supply or flow of seeds 64, 66 from both of the seed hoppers 58, 60 to the seed meter 100. Alternatively, the seed supply device 90 may include two separate control valves (e.g., a first control valve provided in operative association with the input conduit 82 for the first seed hopper 58 and a second control valve provided in operative association with the input conduit 84 for the second seed hopper 60), with each valve configured to be actuated between opened and closed states for controlling the flow of seeds 64, 66 from its respective seed hopper 58, 60 to the seed meter 100.

Additionally, in particular embodiment, the seed supply device 90 may include actively controlled gates configured to be actuated between opened and closed positions to control the flow of seeds 64, 66 to the seed meter 100. For example, a first seed gate may be provided in operative association with the input conduit 82 for the first seed hopper 58 for controlling the flow of seeds 64 of the first seed type to the seed meter 100. Similarly, a second seed gate may be provided in operative association with the input conduit 84 for the second seed hopper 60 for controlling the flow of seeds 66 of the second seed type to the seed meter 100.

Moreover, in another embodiment, the seed supply arrangement may form part of or otherwise be configured as a pre-metered seed supply system. In such an embodiment, the seed supply device 90 may correspond to or may be provided in operative association with a pre-metering device. For example, the seed supply device 90 may include or be associated with one or more fluted feed rolls configured to be rotationally driven by an associated motor, with the fluted feed roll(s) being configured to supply a metered amount of seeds to the seed meter 100 with each partial rotation of the feed roll(s). As such, by actively controlling the rotation of the fluted feed roll(s) (e.g., via controlling the operation of the associated motor), the supply of seeds to the seed meter 100 can be accurately regulated.

Regardless of the specific configuration of the seed supply device 90, such device 90 may be configured to be actively controlled to allow instantaneous control of the flow of seeds 64, 66 to the seed meter 100. For instance, as schematically shown in FIG. 3 and as will be described below, the operation of the seed supply device 90 may be controlled via an electronic controller 202 communicatively coupled to the device 90. In such an embodiment, the controller 202 may be configured to transmit suitable control signals to the seed supply device 90 for controlling its operation, thereby allowing the controller 202 to actively control the supply of seeds 64, 66 to the seed meter 100. For instance, the controller 202 may control the operation of the seed supply device 90 to cut off the supply of seeds 64, 66 from one of the seed hoppers 58, 60 while allowing seeds 64, 66 from the other seed hopper 58, 60 to be conveyed to the seed meter 100. Similarly, the controller 202 may control the operation of the seed supply device 90 such that the supply of seeds 64, 66 from both seed hoppers 58, 60 is either cut-off or turned on.

It should be appreciated that, although the seeds 64, 66 contained within the seed hoppers 58, 60 will generally be described herein as corresponding to different seed "types," it should be appreciated that the description of the different types includes different varieties or hybrids. In other words, the different types of seeds may include not only different varieties of the same plant species, but also different seed products. In this regard, different seed products can include seeds of different species as well as coated and uncoated seeds, such as insecticide coated and non-insecticide coated seeds. The different seed products can also include refuge in a bag seed and non-refuge in a bag seed, plant-parasite resistant seed and non-plant-parasite resistant seed, such as cyst nematode resistant seeds and non-cyst nematode resistant seeds, seed tolerant to herbicide and seed not tolerant to herbicide, or other different products.

It should also be appreciated that the configuration of the seed supply arrangement described above and shown in FIG. 3 is provided only to place the present subject matter in an exemplary field of use. Thus, it should be appreciated that the present subject matter may be readily adaptable to any manner of seed supply arrangement for supplying seeds of differing types to the seed meter 100 of each row unit 28. For instance, as indicated above, in another embodiment, a single seed hopper may be provided at each row unit 28, with the seed hopper being divided into separate compartments or chambers for storing seeds of differing types. In such an embodiment, the seed supply device 90 may be configured to regulate the supply of seeds from each compartment or chamber of the single seed hopper to control which type of seed is delivered to the seed meter 100. Alternatively, in embodiments in which each row unit 28 is not configured to store different seed types locally via separate hoppers or a multi-chamber hopper, the seed supply device 90 may be configured to regulate the supply of seeds from the seed tanks 30 of the planter 20 to control which type of seed is delivered to the seed meter 100. For instance, when seeds of differing types are configured to be supplied from the seed tanks 30 via a pneumatic distribution system, the seed supply device 90 may be provided in operative association with the pneumatic distribution system to control which type of seed is being delivered to the seed meters 100 of the row units 28, either individually or collectively.

Figure 4:
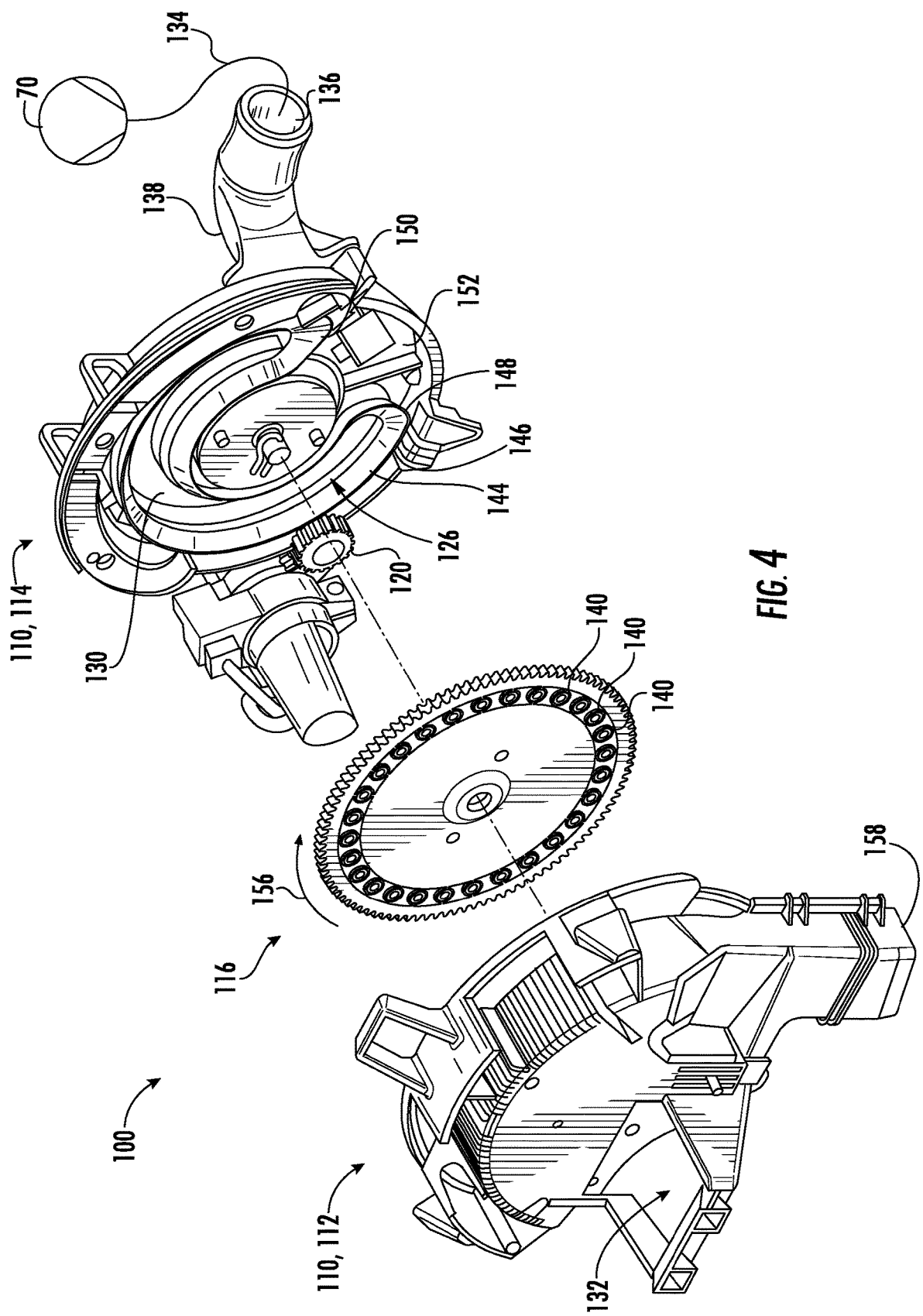
FIG. 4 illustrates a perspective, exploded view of one embodiment of a seed meter suitable for use within a row unit in accordance with aspects of the present subject matter.
Figure 5:
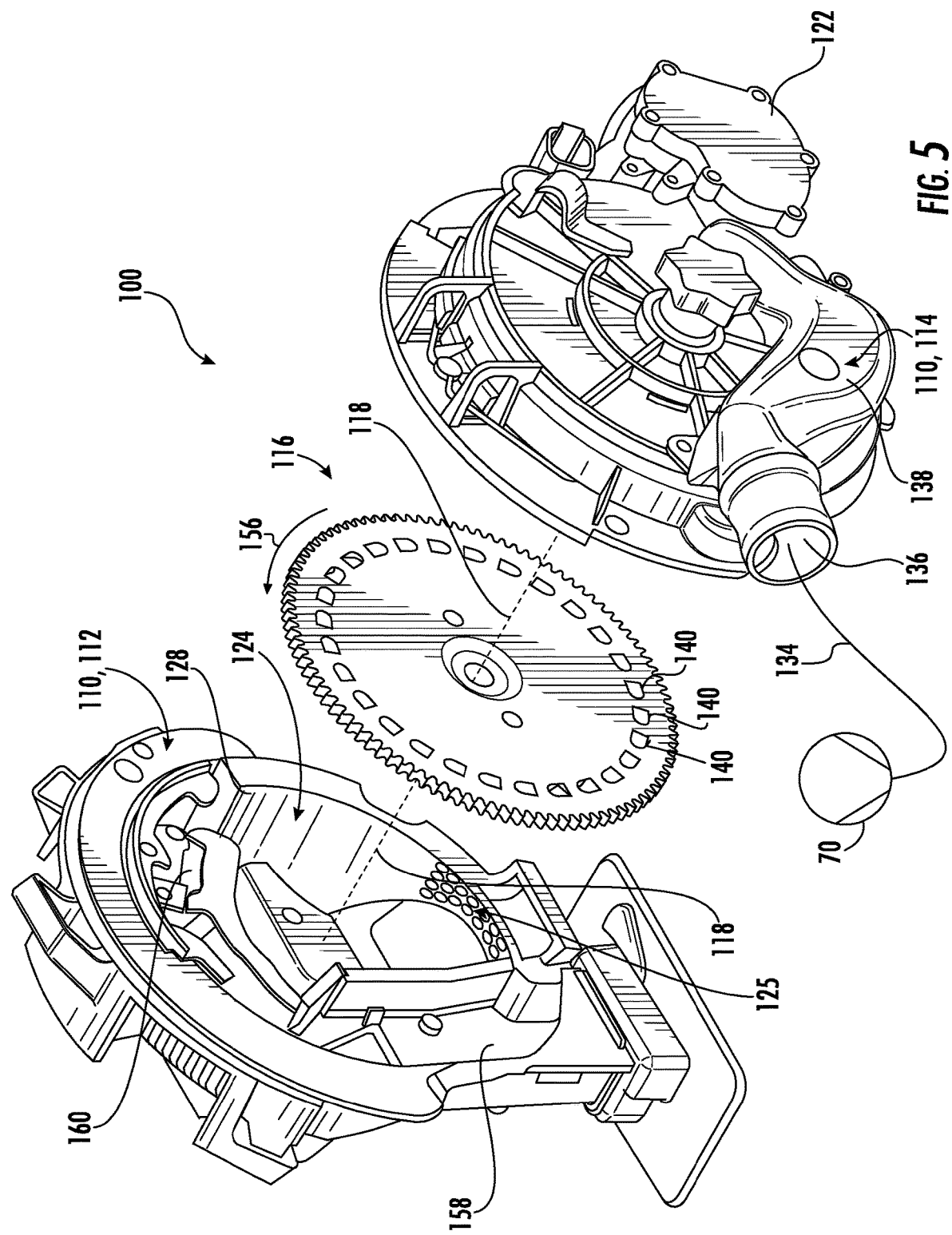
FIG. 5 illustrates another perspective, exploded view of the seed meter shown in FIG. 4.
Figure 6:
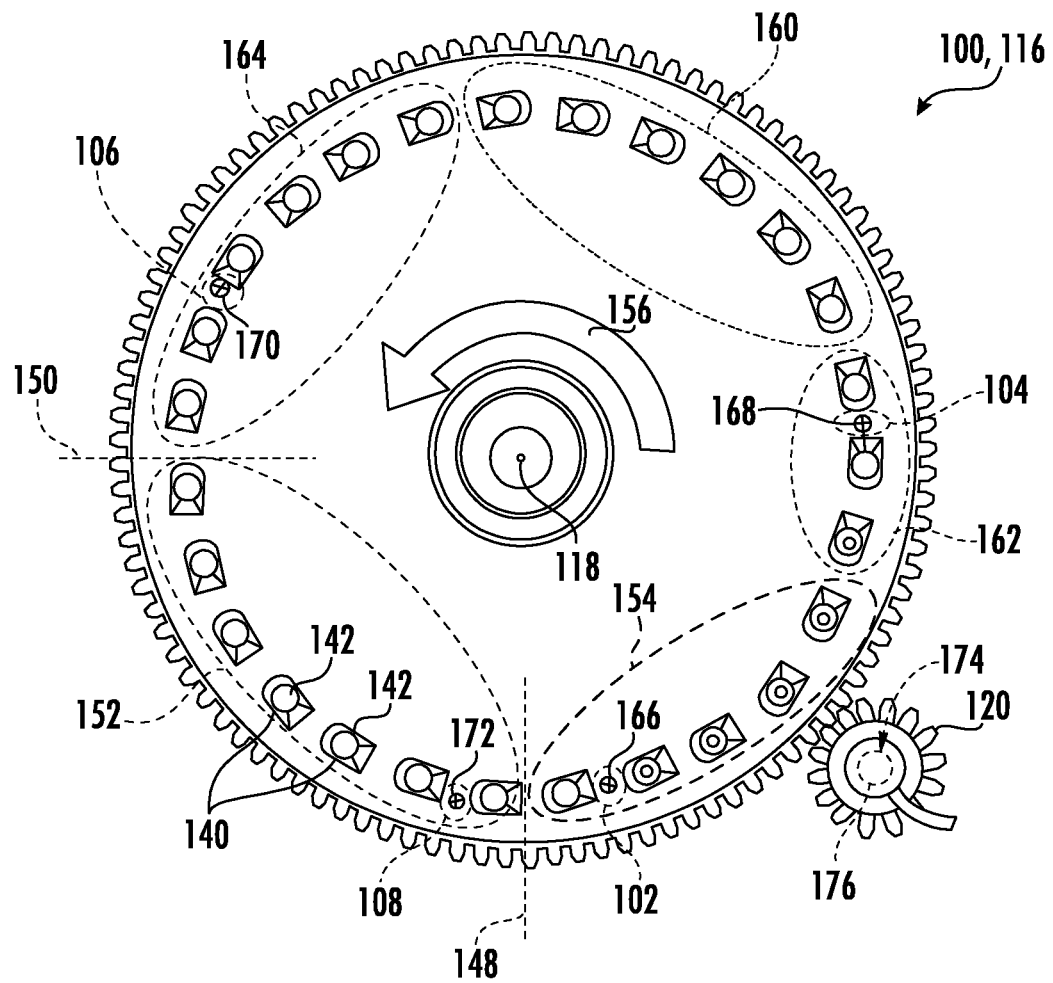
FIG. 6 illustrates a view of one embodiment of a seed transport member suitable for use within the seed meter shown in FIGS. 4 and 5, particularly illustrating various sensors installed relative to the seed transport member.

Referring now to FIGS. 4-6, several views of one embodiment of a seed meter 100 are illustrated in accordance with aspects of the present subject matter. Specifically, FIGS. 4 and 5 illustrate perspective, exploded views of the seed meter 100. Additionally, FIG. 6 illustrates an example view of a seed transport member of the seed meter, particularly illustrating a plurality of sensors that may be installed within the seed meter 100 at differing locations relative to the seed transport member.

In general, the seed meter 100 may include an outer housing 110 configured to encase the various internal components of the meter 100. As shown in FIGS. 4 and 5, the housing 110 may, for example, correspond to a multi-piece assembly, such as by including a seed-side housing component 112 and a vacuum-side housing component 114 configured to be coupled to each other to form the housing 110. Additionally, the seed meter 100 includes a seed transport member 116 configured to be disposed between the housing components 112, 114 within the interior of the seed meter 100. As is generally understood, the seed transport member 116 is carried by the housing 110 about a central axis of rotation (indicated by line 118 in FIG. 5). It should be appreciated that, while the illustrated embodiment of the seed transport member 116 corresponds to a rigid planer disc, the seed transport member 116 can take on any other suitable configuration, such as, for example, the shape of a bowl, a bowler hat, a top hat, a conic, a drum, or any other shape that is symmetric about a central axis of rotation. Moreover, as shown in FIG. 4, in one embodiment, the outer edge of the seed transport member 116 may be configured to engage and be driven by a drive sprocket 120 that is rotatably driven in turn by a meter drive member 122 (FIG. 5), such as a motor, that can be operatively connected and controlled by an associated controller 202 (FIG. 7) to effect rotation of the seed transport member 116 within the housing 110 about the central axis 118.

In one embodiment, both a seed chamber 124 (FIG. 5) and a vacuum chamber 126 (FIG. 4) may be defined within the interior of the seed meter 100 along opposed sides of the seed transport member 116. For instance, as shown in FIG. 5, the seed chamber 124 may be configured to be defined between one side of the seed transport member 116 and an associated seed chamber wall 128 of the seed-side housing component 112. As is generally understood, at least a portion of the seed chamber 124 may define a seed pool 125 (FIG. 5) within which seeds are retained within the seed meter 100 prior to being picked up by the seed transport member 116. Similarly, as shown in FIG. 4, the vacuum chamber 126 may be configured to be defined between the opposed side of the seed transport member 116 and an associated vacuum chamber wall 130 of the vacuum-side housing component 114. In such an embodiment, seeds supplied to the seed meter 100 from the hopper(s) (e.g., via a seed input port 132 (FIG. 4) defined through the seed-side housing component 112) may be delivered into the seed pool 125 defined within the seed chamber 124. By applying a vacuum or air pressure differential to the seed transport member 116 along the side of the seed transport member 116 opposite the seed chamber 124, the seeds contained within the seed chamber 124 may be attached to the seed transport member 116 and subsequently carried with rotation of the seed transport member 116 for discharge from the seed meter 100. As shown schematically in FIGS. 4 and 5, the vacuum chamber 126 of the seed meter 100 may be connected to the associated vacuum source 70 via a suitable vacuum conduit 134. For instance, the vacuum conduit 134 may be coupled to a vacuum port 136 of a vacuum manifold 138 forming part of or otherwise provided in operative association with the vacuum-side housing component 114. As such, a negative pressure from the vacuum source 70 may be applied through the vacuum conduit 134 and associated vacuum manifold 138 to create a vacuum within the vacuum chamber 126 that causes the seeds within the seed chamber 124 to become attached to the opposed side of the seed transport member 116.

As particularly shown in FIG. 6, a plurality of seed cells 140 may be defined around a perimeter region of the seed transport member 116. Specifically, the seed cells 140 may be spaced uniformly apart from each other in an annular array around the seed transport member 116 so that constant rotation of the seed transport member 116 results in a commensurately constant rate at which a seed cell 140 passes a given fixed point within the seed meter 100. As particularly shown in FIG. 6, each seed cell 140 includes an opening 142 defined through the seed transport member 116, thereby allowing the vacuum provided along the opposed side of the seed transport member 116 to be applied through the seed transport member 116 for picking-up a corresponding seed at a given location within the seed meter 100.

As particularly shown in FIG. 4, a sealing gasket 144 may be disposed between the vacuum channel wall 130 and the seed transport member 116 and may define a sealing edge 146 that seals against the adjacent side of the seed transport member 116 facing toward the vacuum channel wall 130 when the seed meter 100 is fully assembled. Thus, as shown in FIG. 4, the seed transport member 116, in combination with the vacuum channel wall 140 and the sealing gasket 144, may collectively define the vacuum chamber 126, which, in the illustrated embodiment generally extends continuously about three quarters of the way around the circumference of the seed transport member 116. Moreover, as shown in FIG. 4, the vacuum chamber 126 may be configured and confined to be coincident with the perimeter portion of the seed transport member 116 around which the seed cells 140 are defined. Accordingly, at any given time when the vacuum source 70 is being operated to impose a negative pressure inside the vacuum chamber 126, a given portion of the seed transport member 116 (e.g., about one quarter of the seed transport member 116 in the illustrated embodiment) will not be subjected to the negative pressure, while the remaining portion of the seed transport member 116 (e.g., three quarters of the seed transport member 116 in the illustrated embodiment) will be subjected to the vacuum or suction force of the vacuum source 70. Thus, as schematically shown in FIG. 6, for example, the circumferential portion of the seed transport member 116 that extends between a proximal end 148 and distal end 150 of the vacuum chamber 126 and that is not subjected to the negative pressure established therein, generally coincides with the seed meter's post-delivery region (indicated by dashed oval 152 in FIG. 6). As is generally understood, the post-delivery region 152 generally extends within the seed meter from the location at which the seeds are designed to separate from the seed transport element 116 (e.g., following rotation past the distal end 150 of the vacuum chamber 126) and the location at which the seed cells 140 are reintroduced to the seed pool within the seed chamber 124 of the seed meter 100 (e.g., following rotation past the proximal end 148 of the vacuum chamber 126).

Similarly, the circumferential portion of the seed transport member 116 that is actually subjected to the negative pressure established within the vacuum chamber 126 may generally correspond to the seed delivery or transport region for the seed meter 100. As particularly shown in FIG. 6, this "seed transport region" of the seed meter 100 may be subdivided into various smaller regions. For instance, a seed acquisition region (indicated by dashed oval 154 in FIG. 6) may be defined that generally encompasses the portion of the seed chamber 124 at which seeds are initially staged or retained for subsequent pick-up by the seed transport member 116 for transport through the remainder of the seed transport region (e.g., in the direction of arrow 156 shown in FIG. 6). The seed acquisition region 154 may also be referred to herein as forming all or a portion of the "seed pool" for the seed meter 100. As the seed transport member 116 delivers a seed through the seed transport region, the seed cell 140 carrying the seed is eventually rotated past the distal end 150 of the vacuum chamber 126 and into the post-delivery region 152, at which point the seed may drop from the seed cell 140 due to the absence of vacuum being applied to the seed transport member 116 for subsequent discharged from the seed meter 100 via a seed output port 158 (FIG. 5) of the meter 100. Additionally, as shown in FIG. 6, when the seed meter 100 includes a singulator (schematically indicated by dashed oval 160 in FIG. 6), the seed transport region may also be sub-divided into a pre-singulation region (indicated by dashed oval 162 in FIG. 6) defined between the singulator 160 and the seed acquisition region 154 and a post-singulation region (indicated by dashed oval 164 in FIG. 6) defined between the singulator 160 and the post-delivery region 152 (or the distal end 150 of the vacuum chamber 126). Thus, seeds picked up by the seed transport member 116 within the seed acquisition region 154 are transported past the pre-singulation region 162 before encountering the singulator 160 and are then transported past the post-singulation region 164 prior to being rotated into the post-delivery region 152.

As indicated above, a plurality of sensors may also be provided in operative association with the seed meter 100. For instance, as shown schematically in FIG. 6, the seed meter 100 may, in one embodiment, include a seed pool sensor 102, a pre-singulation sensor 104, a post-singulation sensor 106, and a post-delivery sensor 108 positioned within the housing 110 for monitoring one or more operating parameters of the seed meter 100. However, it should be appreciated that, in other embodiments, the seed meter 100 may include any other combination of the above-referenced sensors and/or any other additional sensors consistent with the description provided herein. In one embodiment, all or a portion of the above-described sensors 102, 104, 106, 108 may be mounted or otherwise positioned along the vacuum-side of the seed meter 100, thereby preventing dust or other contaminants from building-up on the sensors 102, 104, 106, 108. For instance, the sensors 102, 104, 106, 108 may be mounted within or relative to the vacuum-side housing component 114 such that the sensing end of each sensor 102, 104, 106, 108 is positioned within or adjacent to the vacuum chamber 126. However, in other embodiments, the sensors 102, 104, 106, 108 may be amounted within or relative to the seed-side housing component 112 such that the sensing end of each sensor 102, 104, 106, 108 is positioned within or adjacent to the seed chamber 124.

In general, the seed pool sensor 102 may correspond to any suitable sensor or sensing device configured to monitor the presence or absence of seeds within one or more of the seed cells 140 passing through the seed acquisition region 154 of the seed meter 100. As such, in several embodiments, the seed pool sensor 102 may be configured to provide an indication of the amount of seeds remaining within the seed pool 125 defined within the seed chamber 124. For instance, in one embodiment, the seed pool sensor 102 may have a detection zone that is directed towards the portion of the seed transport member 116 that passes through the relatively lowest region of the seed chamber 124. As such, since seeds will tend to move toward the bottom of the seed chamber 124 due to the influence of gravity, the seed pool sensor 102 may detect the presence or absence of seeds at this lower portion of the seed acquisition region 154 to provide an indication of the amount of seeds remaining within the seed pool 125.

In one embodiment, the seed pool sensor 102 may be positioned within the seed meter 100 such that its detection zone is aligned with a location within the seed acquisition region 154 across which the seed cells 140 are moved with rotation of the seed transport member 116 (e.g., at the detection zone designated by circle 166 in FIG. 6). In such an embodiment, the seed pool sensor 102 may be configured to directly detect the presence or absence of seeds within the seeds cells 140 as the cells 140 pass by the location of the sensor 102. For instance, the seed pool sensor 102 may, in one embodiment, correspond to an optical sensor (e.g., a break-beam sensor having an emitter positioned on one side of the seed transport member 116 and a receiver positioned on the opposed side of the seed transport member 116 or a reflectance-based optical sensor positioned on one side of the seed transport member 116, such as the vacuum side) that is configured to emit a beam of light towards the location of the passing seed cells 140. By detecting the presence or absence of light passing through the seed transport member 116 and/or by analyzing the properties of the light reflected back to the sensor 102, the seed pool sensor 102 may detect the presence or absence of seeds within the passing seed cells 140, which may provide an indication of the amount of seeds remaining within the seed pool 125 defined within the seed chamber 124. For example, as the seed pool 125 begins to become starved of seeds, the seed pool sensor 102 may detect a reduction in the ratio of filled seed cells to empty seed cells as one or more empty seed cells are sensed by the seed pool sensor 102. In such instance, the detection of a given percentage of empty seed cells may be an indicator that the seed meter 100 has become substantially starved of seeds.

Additionally, in several embodiments, the pre-singulation sensor 104 and the post-singulation sensor 106 may generally be configured to detect the presence or absence of seeds contained within the seed cells 140 being conveyed immediately upstream of the singulator 160 and immediately downstream of the singulator 160, respectively. For instance, in one embodiment, the pre-singulation sensor 104 may be positioned within the seed meter 100 such that its detection zone is aligned with a location within the pre-singulation region 162 across which the seed cells 140 are moved with rotation of the seed transport member 116 (e.g., at the detection zone designated by circle 168 in FIG. 6) while the post-singulation sensor 106 may be positioned within the seed meter 100 such that its detection zone is aligned with a location within the post-singulation region 164 across which the seed cells 140 are moved with rotation of the seed transport member 116 (e.g., at the detection zone designated by circle 170 in FIG. 6). In such an embodiment, each of the sensors 104, 106 may, for instance, correspond to an optical sensor (e.g., a break-beam sensor having an emitter positioned on one side of the seed transport member 116 and a receiver positioned on the opposed side of the seed transport member 116 or a reflectance-based optical sensor positioned on one side of the seed transport member 116, such as the vacuum side) that is configured to emit a beam of light towards the location of the passing seed cells 140. By detecting the presence or absence of light passing through the seed transport member 116 and/or by analyzing the properties of the light reflected back to each sensor 104, 106, the pre- and post-singulation sensors 104, 105 may detect the presence or absence of seeds within the passing seed cells 140.

Moreover, the post-delivery sensor 108 may generally have a detection zone that is directed towards the portion of the seed transport member 116 that passes through the post-delivery region 152 of the seed meter 100. Specifically, in several embodiments, the post-delivery sensor 108 may be positioned within the seed meter 100 such that its detection zone is aligned with a location within the post-delivery region 152 across which the seed cells 140 are moved with rotation of the seed transport member 116 (e.g., at the detection zone designated by circle 172 in FIG. 6). In such embodiments, given the absence of a vacuum being applied to the seed transport member 116 with the post-delivery region 152, the post-delivery sensor 108 may generally be configured to detect the empty seed cells 140 passing by the location of the sensor 108 following the release of the seeds contained therein (e.g., following rotation past the distal end 150 of the vacuum chamber 126) but prior to such seed cells 140 being reintroduced back into the seed pool within the seed chamber 124 of the seed meter 100 (e.g., following rotation past the proximal end 148 of the vacuum chamber 126). For instance, the post-delivery sensor 108 may correspond to an optical sensor (e.g., a break-beam sensor having an emitter positioned on one side of the seed transport member 116 and a receiver positioned on the opposed side of the seed transport member 116 or a reflectance-based optical sensor positioned on one side of the seed transport member 116, such as the vacuum side) that is configured to emit a beam of light towards the location of the passing seed cells 140. By detecting the presence or absence of light passing through the seed transport member 116 and/or by analyzing the properties of the light reflected back to the sensor 108, the post-delivery sensor 108 may detect each empty cell 140 passing through the post-delivery region 152. In addition, the post-delivery sensor 108 may also be used to detect a seed that is stuck or that otherwise remains within its corresponding seed cell 140 as the seed cell 140 as rotated through the post-delivery region 152.

Further, in several embodiments, the seed meter 100 may also include one or more position sensors 174 configured to monitor the rotation and/or rotational position of the seed transport member 116 within the seed meter 100. In general, the position sensor 174 may correspond to any suitable sensing device(s) that allows the sensor to function as described herein. In one embodiment, the position sensor 174 may correspond to a rotary encoder 176 (FIG. 6) configured to monitor the extent of rotational travel of the seed transport member 116. For instance, as shown in FIG. 6, the rotary encoder 176 may be provided in operative association with the drive sprocket 120 configured to rotationally drive the seed transport member 116. As such, by detecting the rotation of the drive sprocket 120 via the encoder 176, the angular extent across which the seed transport member 116 has been rotated can be determined. For instance, when the rotary encoder 176 corresponds to an optical encoder, the pulse signals received from the optical encoder may be used to determine the extent to which the seed transfer member 116 has been rotated by knowing the gear ratio defined between the drive sprocket 120 and the seed transfer member 116. In an alternative embodiment, the rotary encoder 176 may be configured to directly monitor the rotational travel of the seed transfer member 116, such as by being provided in operative association with a shaft or bearing (not shown) about which the seed transfer member 116 rotates.

In other embodiments, the position sensor 174 may correspond to any other suitable sensing device(s). For instance, in another embodiment, the position sensor 174 may correspond to a simple pulse counter or an analog rotary position sensor configured to provide sensor data associated with the rotational position and/or amount of rotation of the seed transport member 116. In such an embodiment, the position sensor 174 may, for example, comprise a Hall Effect sensor configured to output an analog signal representative of the rotational position of the seed transport member 116 and/or the extent to which the seed transport member 116 has been rotated within the seed meter 100. For example, a Hall Effect sensor may be used to detect one or more small magnets embedded within the seed transport member 116 (e.g., a single magnet or a plurality of circumferentially spaced magnets) as the seed transport member 116 is rotated past the sensor. In such an embodiment, by detecting the magnet(s) rotating past the Hall Effect sensor, the sensor may provide a signal indicative of the rotational position of the seed transport member 116 and/or the extent to which the seed transport member 116 has been rotated between successive detections. In another embodiment, a magnet(s) may be embedded within the shaft configured to rotationally drive the seed transport member 116, such as the shaft that rotationally drives the drive sprocket 120. In such an embodiment, a Hall Effect sensor may, for example, be used to output an analog signal indicating each time the magnet(s) is rotated past the sensor. Accordingly, by knowing the gear ratio between the shaft and the seed transport member 116, the analog signals provided by the sensor may be used to monitor the extent to which the seed transport 116 has been rotated within the seed meter 100.

In yet another embodiment, the position sensor 174 may correspond to an optical sensor (e.g., a reflectance-based optical sensor, a laser range-finding sensor (e.g., a LIDAR sensor) and/or the like) configured to detect one or more features provided on and/or defined by the seed transport member 116. For instance, in addition to detecting seed cells 140 and/or seeds contained within the seed cells 140, an optical sensor may be used to detect a coating or other surface feature(s) provided on the seed transport member 116, such as reflective surface features formed using paint, tape, a different type of reflective coating material(s) and/or the like. Similarly, the optical sensor may also be used to detect one or more physical features defined by and/or on the seed transport member 116, such as one or more gaps, openings or holes (e.g., one or more openings or holes not corresponding to seed cells 140), bosses, protrusions, and/or other physical features. In such an embodiment, by configuring the position sensor 174 as an optical sensor capable of detecting such optically-recognizable or discernible features (e.g., surface features and/or physical features), the sensor 174 may provide an indication of the rotational position of the seed transport member 116 within the seed meter 100 and/or the extent to which the seed transport member 116 has been rotated within the seed meter 100.

In a further embodiment, the position sensor 174 may correspond to an acoustic sensor(s) (e.g., an ultrasonic sensor) and/or a radar sensor configured to detect features on and/or defined by the seed transport member 116 (e.g., physical features) by detecting variations in sound and/or electromagnetic waves reflected off of a surface of the seed transport member 116.

As will be described below, in several embodiments, one or more of the sensors 102, 104, 106, 108, 174 described above may be configured to serve as a timing sensor for providing timing signals to an associated controller 202 of the disclosed system. Specifically, in several embodiments, the timing sensor may configured to generate timing signals that can be used by the controller 202 to determine when to sample and/or evaluate the sensor data generated by any of the other sensors provided in operative association with the seed meter 100 or the data generated by the timing sensor itself. For example, based on the timing signals received from the timing sensor, the controller 202 may be configured to determine when a given seed cell 140 is passing through the detection zone of the seed pool sensor 102, the pre-singulation sensor 104, the post-singular sensor 106, and/or the post-delivery sensor 108. In such an embodiment, the controller 202 may sample and/or evaluate the data generated by such sensor(s) as the seed cell 140 is passing by the location of the sensor's detection zone to detect the presence or absence of a seed within the passing seed cell 140.

It should be appreciated that the configuration of the seed meter 100 described above and shown in FIGS. 4-6 is provided only to place the present subject matter in an exemplary field of use. Thus, it should be appreciated that the present subject matter may be readily adaptable to any manner of seed meter configuration. For example, as will be described below with reference to FIGS. 9 and 10, the seed transport member 116 may include multiple annular arrays of seed cells, such as a pair of concentric annular arrays, for transporting seeds within the seed meter 100 from the seed pool to the distal end 150 of the vacuum chamber 126.

Figure 7:
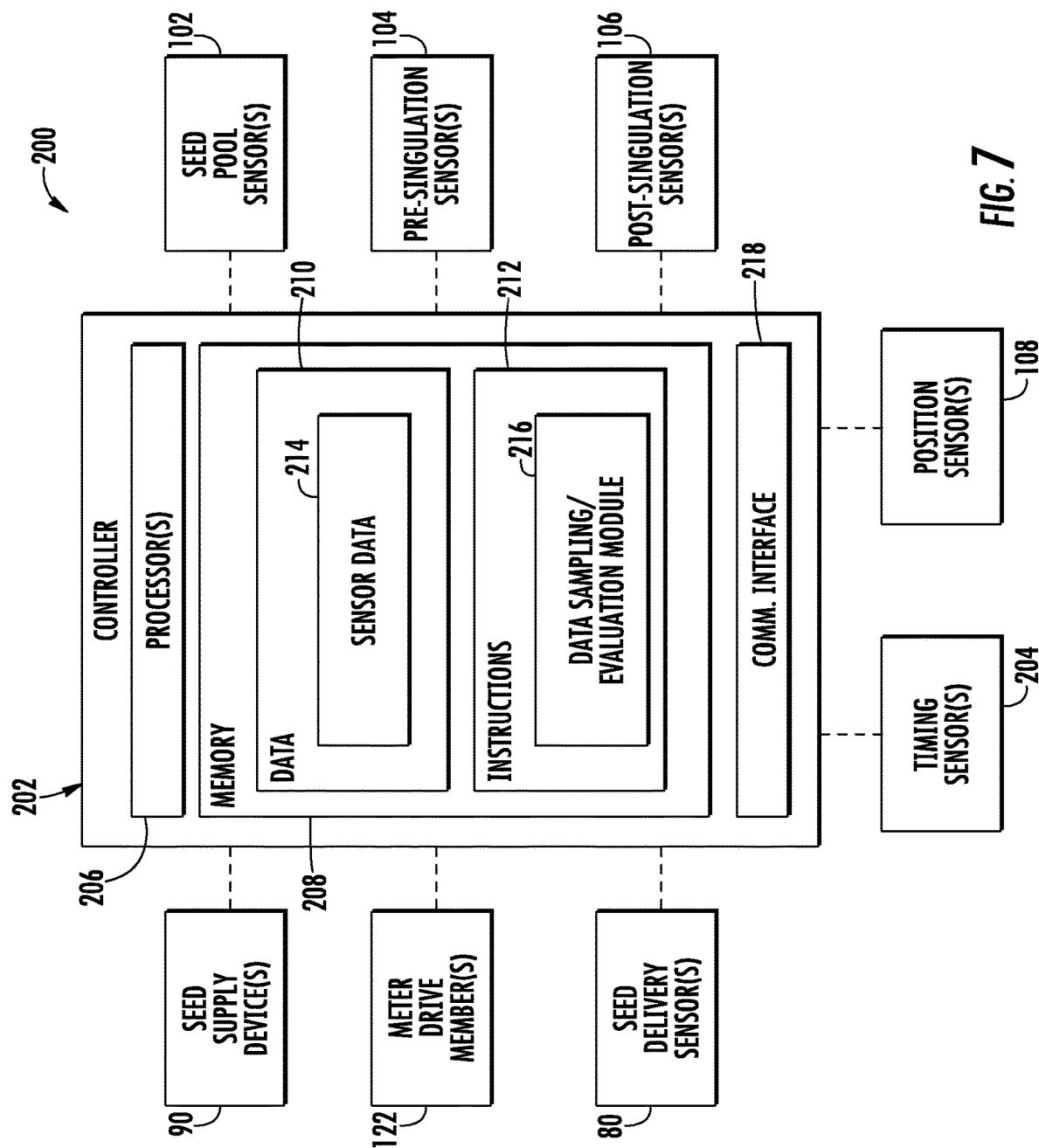
FIG. 7 illustrates a schematic view of one embodiment of a system for monitoring the operation of a seed meter in accordance with aspects of the present subject matter.

Referring now to FIG. 7, a schematic view of one embodiment of a system 200 for monitoring the operation of a seed meter is illustrated in accordance with aspects of the present subject matter. In general, the system 200 will be described herein with reference to the planting implement 20, the row unit 28, and the seed meter 100 described above with reference to FIGS. 1, 2, and 4-6, as well as the seed supply arrangement shown in FIG. 3. However, it should be appreciated that the disclosed system 200 may generally be utilized with any planter or seeder having any suitable implement configuration, with row units having any suitable row unit configuration, with seed meters having any suitable meter configuration and/or with seed transport members have any suitable transport member configuration. For example, in one alternative embodiment, the presently disclosed system 200 may be used to monitor one or more aspects of the operation of a seed meter including a seed transport member having the configuration shown in FIGS. 9 and 10. Similarly, the disclosed system 200 may generally be utilized with any suitable seed supply arrangement for regulating the supply of seeds to the seed meter 100 of a row unit 28.

In several embodiments, the system 200 may include a controller 202 and various other components configured to be communicatively coupled to and/or controlled by the controller 202, such as a meter drive member 122 configured to rotationally drive the seed meter 100, a seed supply device 90 configured to regulate the supply of seeds to the seed meter 100, and/or various sensors configured to monitor one or more operating parameters associated with the seed meter 100. For example, the controller 202 may be communicatively coupled to one or more sensors located within the seed meter 100 (e.g., the seed pool sensor 102, the pre-singulation sensor 104, the post-singulation sensor 106, and/or the post-delivery sensor 108) that are configured to provide sensor data indicative of whether a seed is present or absent within the seed cell 140 passing by the location(s) of each sensor's detection zone. As such, by analyzing the sensor data received from such sensor(s) to determine the presence or absence of seeds within the various seed cells 140, the controller 202 may be configured to detect various issues associated with the operation of the seed meter 100, such as poor feeding of the seeds from the seed hopper(s) 58, 60 to the seed transport member 116, poor seed pick-up by the seed transport member 116 from the seed pool, seed skips (e.g., due to over-aggressive singulation or a low supply of seeds within the meter), plugged seed cells 140, and/or the like. Additionally, in the context of multi-variety seed meters, the ability to detect the presence or absence of seeds within the seed cells 140 may allow the controller 202 to accurately adjust or schedule switching between different seed types or varieties, such as by using the number of open seed cells 140 detected by the seed pool sensor 102, the pre-singulation sensor 104, and/or the post-singulation sensor 106 to estimate the amount of seeds remaining within the seed pool, thereby providing an indication as to when the seed count has reached a level at which it is appropriate to switch to the new seed type or variety.

However, as indicated above, sensing the presence or absence of a seed within a given seed cell 140 using sensors located within the seed meter 100 can often be problematic (e.g., due to soiling of the sensors and/or due to the specific placement of the sensors within the seed meter 100, such as when the sensors are placed on the vacuum-side of the seed transport member 116 opposite the side along which the seeds are being transported). Thus, in accordance with aspects of the present subject matter, the system 200 may include one or more timing sensors 204 configured to generate a timing signal(s) that provides the controller with a timing input for determining when to sample and/or evaluate the data generated by one or more of the sensors located within the seed meter 100. As will be described below, the timing sensor 204 may generally correspond to any suitable sensor(s), including any of the sensors described herein. For example, in several embodiments, the timing sensor 204 may correspond to the post-delivery sensor 108 and/or the position sensor 174 (including using a combination of such sensors to generate related timing signals). However, in other embodiments, the timing sensor(s) 204 may correspond to any other suitable sensor(s), such as the seed delivery sensor 80, the seed pool sensor 102, the pre-singulation sensor 104, the post-singulation sensor 106, and/or the like. Additionally, it should be appreciated that, in one embodiment, the timing sensor 204 may correspond to a separate sensor(s) than the sensor(s) being relied upon by the controller 202 to detect the presence or absence of seeds within the seed cells 140. Alternatively, the same sensor may be configured to provide the controller 202 with both timing signals and associated sensor data that can be analyzed to determine the presence or absence of seeds within the seed cells 140.

It should be appreciated that the controller 202 may correspond to any suitable processor-based device(s), such as a computing device or any combination of computing devices. Thus, as shown in FIG. 7, the controller 202 may generally include one or more processor(s) 206 and associated memory devices 208 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 208 may generally be configured to store information accessible to the processor(s) 206, including data 210 that can be retrieved, manipulated, created and/or stored by the processor(s) 206 and instructions 212 that can be executed by the processor(s) 206.

In several embodiments, the data 210 may be stored in one or more databases. For example, the memory 208 may include a sensor database 214 for storing sensor data, data associated with the relative positioning of the various sensors within the seed meter 100 (e.g., including relative circumferential offset data between the various sensors based on the circumferential spacing of the seed cells 140), and/or other relevant data that may be used by the controller 202 in accordance with aspects of the present subject matter (e.g., data associated with the geometry of the seed transport member 116, including the arrangement and/or spacing of the seed cells 140 along the seed transport member 116). For instance, during operation of the seed meter 100, data from all or a portion of the sensors communicatively coupled to the controller 202 may be stored (e.g., temporarily) within the sensor database 214 and subsequently used to determine one or more parameter values associated with the operation of the seed meter 100 (e.g., the presence or absence of seeds within the various seed cells 140, the extent of rotation of the seed transport member 116 across a given time period, and/or the like).

Additionally, in several embodiments, the instructions 212 stored within the memory 208 of the controller 202 may be executed by the processor(s) 206 to implement a data sampling/evaluation module 216. In general, the data sampling/evaluation module 216 may be configured to sample and/or evaluate the data received from the various sensors communicatively coupled to the controller 202. In one embodiment, the data sampling/evaluation module 216 may be configured to continuously sample and/or evaluate the data from one or more of the sensors described herein. Alternatively, as will be described below, the data sampling/evaluation module 216 may be configured to selectively sample and/or evaluate the sensor data based on the timing signals received from the timing sensor 204. For example, based on the timing signals, the controller 202 may be configured to sample and/or evaluate the sensor data received from the seed pool sensor 102, the pre-singulation sensor 104, and/or the post-singulation sensor 106 at each instance at which it is determined that a seed cell 140 is passing through the detection zone of such sensor(s).

Moreover, as shown in FIG. 7, the controller 202 may also include a communications interface 218 to provide a means for the controller 202 to communicate with any of the various other system components described herein. For instance, one or more communicative links or interfaces (e.g., one or more data buses) may be provided between the communications interface 216 and both the meter drive member 122 and the seed supply device 90 to allow the controller 202 to transmit control signals for controlling the operation of such components. Similarly, one or more communicative links or interfaces (e.g., one or more data buses) may be provided between the communications interface 216 and the various sensors to allow the associated sensor data to be transmitted to the controller 202.

It should be appreciated that, in general, the controller 202 of the disclosed system 200 may correspond to any suitable computing device(s) that is configured to function as described herein. In several embodiments, the controller 202 may form part of an active planting system configured to perform a planting operation, such as by corresponding to a vehicle controller of a work vehicle configured to tow an associated planter 20 and/or an associated implement controller of the planter 20.

As indicated above, the disclosed timing sensor 204 may generally correspond to any suitable sensor(s) and/or sensing device(s), including any one or a combination of the various sensors described herein. For example, in several embodiments, the timing sensor 204 may correspond to the post-delivery sensor 108. Specifically, since the post-delivery sensor 108 is generally configured to detect open seed cells 104 passing through the sensor's detection zone 172 within the post-delivery region 152, the sensor 108 may be configured to generate "timing signals" that can be used by the controller 202 to identify the instance or moment at which the seed cells 140 are passing by a known location within the seed meter 100 (i.e., the location of the post-delivery sensor 108). In such an embodiment, by knowing the arrangement and spacing of the seed cells 140 the seed transport member 116 as well as the relative positioning of the sensors within the seed meter 100, the controller 202 may be configured to utilize the "timing signals" received from the post-delivery sensor 108 as a timing mechanism or means to determine when individual seed cells 140 will be passing through the detection zone(s) of one or more of the other sensors within the seed meter 100 (e.g., the seed pool sensor 102, the pre-singulation sensor 104, and/or the post-singulation sensor 106). The controller 202 may then sample and/or evaluate the sensor data generated by such other sensor(s) at a single point in time or instance at which it is known that a seed cell is passing through the detection zone(s) of the sensor(s) or along a discrete time period across which is it is known that a seed cell will be passing through the detection zone(s) of the sensor(s).

It should be appreciated that the specific methodology used to sample and/or evaluate the sensor data based on the timing signals received from the post-delivery sensor 108 (or any other suitable timing sensor 204) may vary, for example, depending on the relative positioning of the sensors within the seed meter 100. For instance, in one embodiment, each of the cell-aligned sensors (e.g., the seed pool sensor 102, the pre-singulation sensor 104, the post-singulation sensor 106, and the post-delivery sensor 108) may be installed within the seed meter 100 such that, when a given seed cell 140 is passing by the location of the post-delivery sensor 108, each of the other sensors is also aligned with a seed cell 140 of the seed transport member 116 (i.e., such that separate seed cells 140 simultaneously pass through the individual detection zones of the respective sensors). In such an embodiment, since the sensor positioning provides for simultaneously alignment of the sensors with respective seed cells 140, the timing signals received from the post-delivery sensor 108 may be used as a trigger to immediately sample and/or evaluate the sensor data from each of the other sensors 102, 104, 106 to detect the presence or absence of seeds within the passing seed cells 140.

In other embodiments, the sensors 102, 104, 106, 108 may be installed within the seed meter 100 at differing relative circumferential positions such that the sensors encounter seed cells 140 at different times. In such embodiments, the timing signals received from the post-delivery sensor 108 may be used as a trigger to initiate a trace sampling of the sensor data from the other sensors 102, 104, 106 or as an index signal for determining when the other sensors 102, 104, 106 will subsequently encounter seed cells 140. For example, in one embodiment, upon receipt of each timing signal from the post-delivery sensor 108, the controller 202 may be configured to initiate a trace sampling of the sensor data from the other sensors over a discrete sampling period or across a time period associated with the seed transport member 116 being rotated a given amount within the seed meter 100. The sensor data received from each sensor may then be analyzed to determine the presence or absence of a seed within the seed cell 104 passing through the detection zone of such sensor across the associated trace sampling.

In another embodiment, a predetermined circumferential offset value(s) may be stored within the controller's memory 208 that correlates the position of the post-delivery sensor 108 to the position(s) of the other sensors 102, 104, 106 with reference to the circumferential spacing of the seed cells 140 of the seed transport member 116. In such an embodiment, upon receipt of a timing signal(s) from the post-delivery sensor 108, the controller 202 may be configured to delay sampling or evaluating the sensor data from each of the other sensors 102, 104, 106 based on the circumferential offset value associated within such sensor. For example, the circumferential offset value for a given sensor may be indicative of the amount that the seed transport 116 member must be rotated between when the post-delivery sensor 108 detects a seed cell 140 and when a seed cell 140 subsequently passes through the detection zone of the associated sensor. In such an embodiment, the timing signal received from the post-delivery sensor 108 may be used in combination with the data received from the position sensor 174 to determine the extent to which the seed transport member 116 has rotated following receipt of the timing signal. Once the seed transport member 116 has been rotated an amount corresponding to the circumferential offset value associated with one of the other sensors, the controller 202 may then sample and/or evaluate the sensor data from such sensor (e.g., via a single-point sampling or a short trace sampling) to determine whether a seed is present or absent within the seed cell 140 passing by the associated sensor. The use of such a methodology may allow for a substantial amount of flexibility in positioning the various sensors 102, 104, 106, 108 within the seed meter 100, as each individual sensor may have a unique offset value that correlates its position to the position of the post-delivery sensor 108 with reference to circumferential spacing of the passing seed cells 140.

As an example, in an embodiment in which the position sensor 174 corresponds to a rotary encoder or an analog pulse counter, the circumferential offset value associated with each sensor may correspond to or be associated with a predetermined number of pulses received from the encoder or pulse counter. In such an embodiment, the controller 202 may monitor the number of pulses received from the position sensor 174 following receipt of each timing signal from the post-delivery sensor 108. When the number of received pulses is equal to the predetermined number of pulses corresponding to the circumferential offset value for one of the sensors, the controller 202 may be configured to sample and/or evaluate the sensor data from such sensor to determine whether a seed is present within the passing seed cell 140.

It should be appreciated that, in other embodiments, the circumferential offset value may correspond to or be associated with a time delay across which the controller 202 is configured to wait following receipt of the timing signal prior to sampling and/or evaluating the data from one or more of the sensors. For example, based on the positioning of each sensor within the seed meter 100, a time delay may be associated with each sensor that is dependent upon the rotational speed of the seed transport member 116. In such an embodiment, by knowing the speed at which the seed transport member 116 is being rotated within the seed meter 100, the controller 202 may determine the appropriate time delay for each of the other sensors. Thereafter, upon receipt of each timing signal from the post-delivery sensor 108, the controller 202 may be configured to sample and/or evaluate the sensor data from each sensor (e.g., via a single-point sampling or a short trace sampling) following the expiration of the associated time delay to determine whether a seed is present or absent within the seed cell 140 passing through such sensor's detection zone.

It should also be appreciated that, in addition to being used in combination with the post-delivery sensor 108, the disclosed position sensor 174 may also be used as an independent source of timing signals for sampling and/or evaluating sensor data from one or more of the other sensors located within the seed meter 100. For example, as indicated above, the position sensor 174 may be configured to detect the extent to which the seed transport member 116 has been rotated within the seed meter 100. In such an embodiment, by having an initial index signal(s) that correlates the positioning of the seed cells 140 of the seed transport member 116 relative to each of the other sensors at a given instance, the controller 202 may be configured to determine the moment at which each sensor will encounter a seed cell 140 by monitoring the rotation of the seed transport member 116 within the seed meter 100 via the sensor data received from the position sensor 174. The controller 202 may then sample and/or evaluate the sensor data for each sensor at the instance a given seed cell 140 is passing through the sensor's detection zone to determine whether a seed is present or absent from such seed cell 140.

When using the position sensor 174 as a source for timing signals, it should be appreciated that the associated index signal may be received from any suitable source that provides the controller 202 with a reference point for establishing the initial positioning of the seed cells 140 relative to one or more of the sensors. For example, in one embodiment, the sensor data received from the seed pool sensor 102, the pre-singulation sensor 104, the post-singulation sensor 106 and/or the post-delivery sensor 108 may be used to detect the instance at which a seed cell 140 passes by such sensor(s), which may then be used as the initial index signal for establishing the current circumferential position of the seed cells 140 relative to each of the sensors. Thereafter, by monitoring the rotation of the seed transport member 116, the controller 202 may determine the exact instance at which a given seed cell 140 will pass through the detection zone of each sensor.

As indicated above, in addition to the post-delivery sensor 108 and/or the position sensor(s) 174 (or as an alternative thereto), any other suitable sensor(s) may be used to generate timing signals for use in evaluating the sensor data received from any other sensors or from the timing sensor itself. For example, at start-up of the seed meter 100, several open seed cells 140 may initially pass by the pre-singulation sensor 104 and/or the post-singulation sensor 106 prior to any filled seed cells 140 being rotated past such sensor(s) 104, 106. In such an embodiment, the pre-singulation sensor 104 and/or post-singulation sensor 106 may be configured to detect the series of open seed cells 140 passing thereby, which may then be used as a timing signal(s) by the controller 202 for determining when subsequent seed cells 140 will pass by the sensor(s) 104, 106 or any other suitable sensors within the seed meter 100 (e.g., the seed pool sensor 102 and/or the post-delivery sensor 104). Such input signals may also be used as initial index signals for calibrating the rotational position data received from the position sensor 174.

Additionally, as indicated above, the seed pool sensor 102, the pre-singulation sensor 104, and the post-singulation sensor 106 may be configured to detect seeds contained within the seed cells 140 passing by the location of each sensor. As a result, the periodic detection of seeds by any of such sensors within each passing seed cell 140 may be used by the controller 202 as a timing signal for sampling and/or evaluating the sensor data from the various sensors. For example, in an embodiment in which the seed pool sensor 102 is installed on the vacuum side of the seed meter 100 (and, thus, will not be subject to substantial soiling), the sensor data received from the seed pool sensor 102 may be initially evaluated to detect the instance or frequency at which seed cells 140 are passing such sensor. This determined instance or frequency may then be used as a timing mechanism for subsequently sampling and/or evaluating the data from the seed pool sensor 102 and/or any of the other sensors.

Moreover, as indicated above, the seed delivery sensor 80 may also function as a timing sensor for providing timing signals to the controller 202. For example, when the seed delivery sensor 80 is configured to detect seeds passing through the seed tube 72, the periodic detection of such passing seeds may be used as a timing signal by the controller 202 to sample and/or evaluate the sensor data from one or more of the other sensors.

Figure 8:
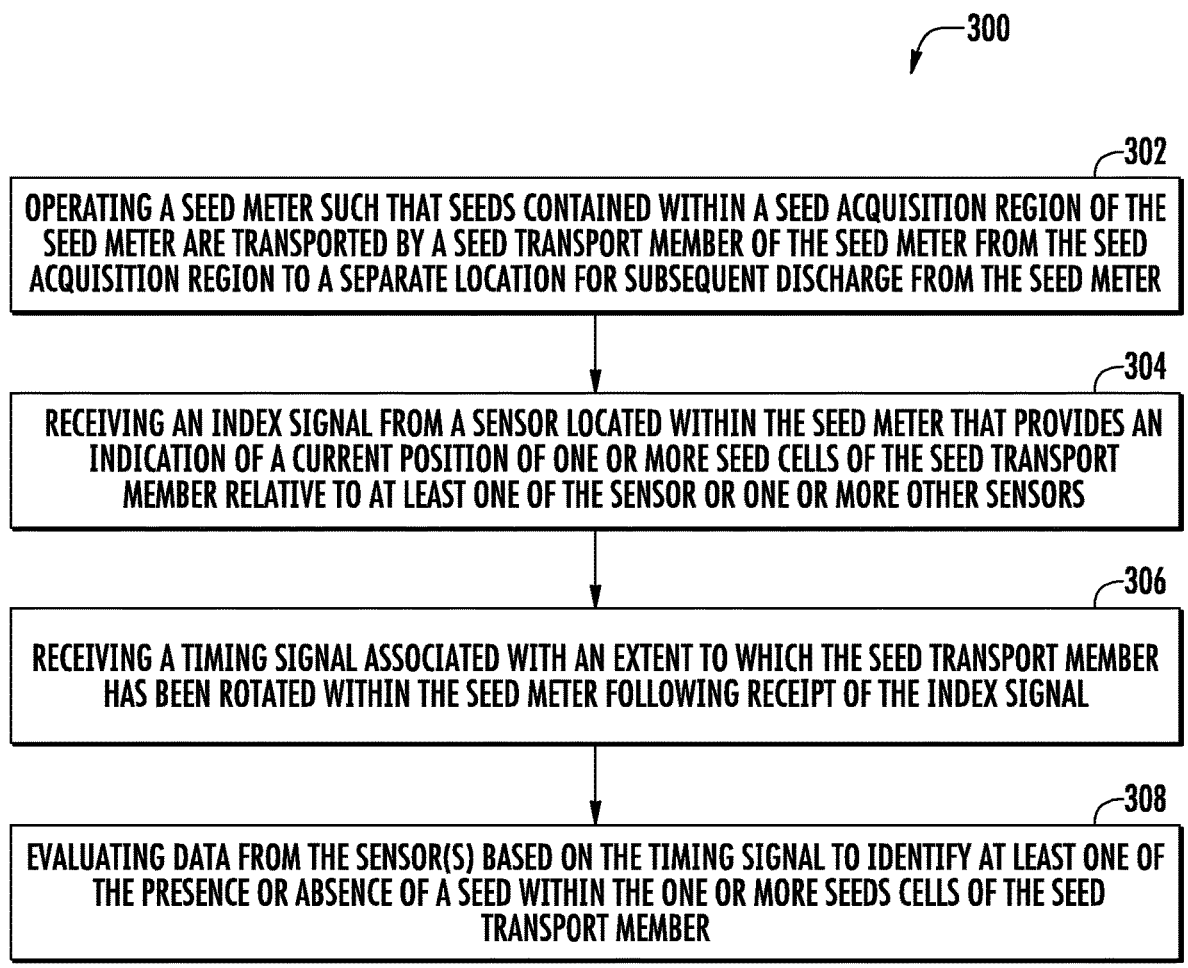
FIG. 8 illustrates a flow diagram of one embodiment of a method for monitoring the operation of a seed meter in accordance with aspects of the present subject matter.

Referring now to FIG. 8, a flow diagram of one embodiment of a method 300 for monitoring the operation of a seed meter is illustrated in accordance with aspects of the present subject matter. In general, the method 300 will be described herein with reference to the system 200 described above with reference to FIG. 7 and the seed meter configuration described above with reference to FIGS. 4-6. However, it should be appreciated by those of ordinary skill in the art that the disclosed method 300 may be implemented within any other system and/or any other suitable seed meter having any other suitable configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (302), the method 300 includes operating a seed meter such that seeds contained within a seed acquisition region of the seed meter are transported by a seed transport member of the seed meter from the seed acquisition region to a separate location for subsequent discharge from the seed meter. For example, as indicated above, the seed transport member 116 may be configured to be rotated within the seed meter 100 such that seeds are collected by the seed transport member 116 within the seed acquisition region 154 and carried to the distal end 150 of the vacuum chamber 126, at which point the seeds drop from the seed transport member 116 and are discharged from the seed meter 100.

Additionally, at (304), the method 300 includes receiving an index signal from a sensor located within the seed meter that provides an indication of a current position of one or more seed cells of the seed transport member relative to at least one of the sensor or one or more other sensors. For example, as indicated above, the controller 202 may be configured to receive an initial index signal that provides a reference point for establishing the initial positioning of the seed cells 140 relative to one or more of the sensors. Such index signal may, for instance, derive from the seed pool sensor 102, the pre-singulation sensor 104, the post-singulation sensor 106, and/or the post-delivery sensor 108.

Moreover, at (306), the method 300 includes receiving a timing signal associated with an extent to which the seed transport member has been rotated within the seed meter following receipt of the index signal. For instance, as indicated above, the controller 202 may be configured to receive timing signals from the position sensor 174 that provide an indication of the extent to which the seed transport member 116 has been rotated within the seed meter 100. Such timing signals may then be used by the controller 202 to determine when a given seed cell 140 will pass through the detection zone of one or more of the other sensors 102, 104, 106, 108.

Referring still to FIG. 8, at (308), the method 300 includes evaluating data from the sensor(s) based on the timing signal to identify at least one of the presence or absence of a seed within the one or more seeds cells of the seed transport member. Specifically, by using the timing signals to determine the instance at which each sensor 102, 104, 106, 108 will be aligned with a seed cell, the controller 202 may be configured to selectively evaluate the data received from such sensor to identify the presence or absence of a seed within the passing seed cell 140.

Figure 9:
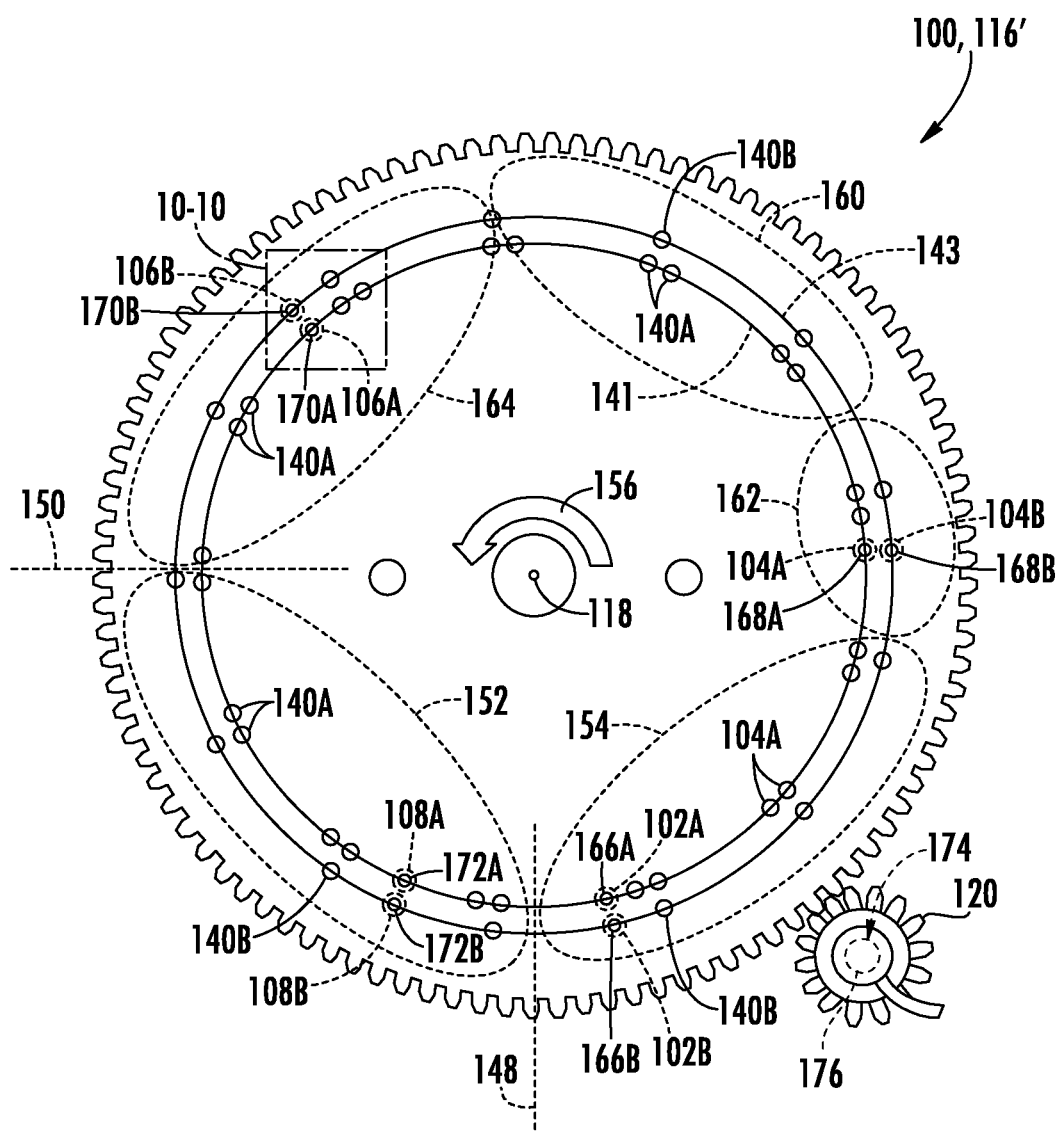
FIG. 9 illustrates a view of another embodiment of a seed transport member configured in accordance with aspects of the present subject matter, particularly illustrating various sensors installed relative to the seed transport member.
Figure 10:
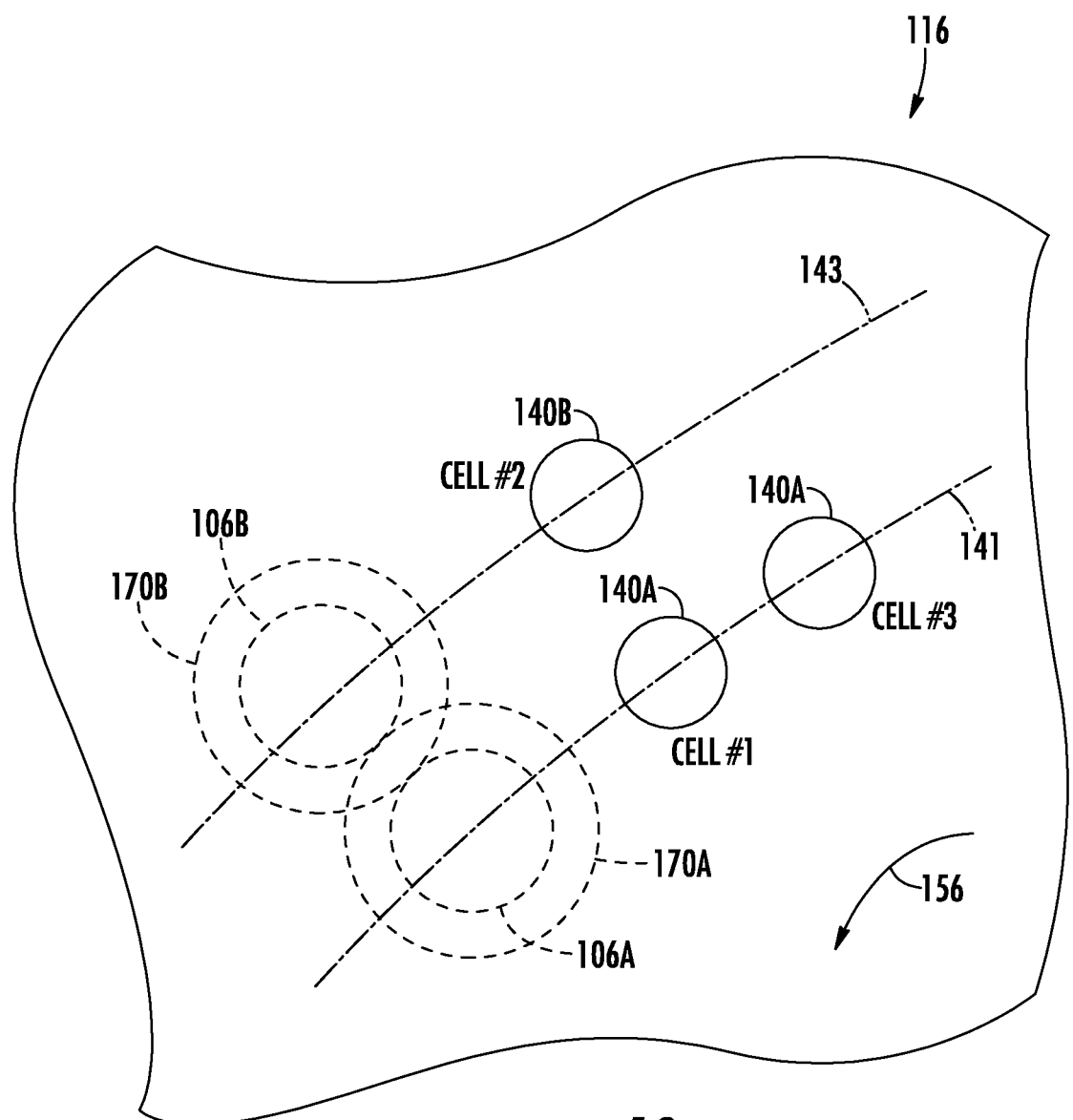
FIG. 10 illustrates a close-up view of a portion of the seed transport member shown in box 10-10 of FIG. 9.

Referring now to FIGS. 9 and 10, differing views of another embodiment of a suitable seed transport member 116' that may be utilized within embodiments of the disclosed seed meter 100 and related system 200 are illustrated in accordance with aspects of the present subject matter. Specifically, FIG. 9 illustrates a side view of the seed transport member 116' and FIG. 10 illustrates a close-up view of a portion of the seed transport member 116' shown within box 10-10 in FIG. 9.

In general, the seed transport member 116' is configured similarly to the seed transport member 116 described above with reference to FIGS. 4-6. For example, the seed transport member 116' is configured to be rotated about a central axis 118 in a given rotational direction (e.g., as indicated by arrow 156 in FIGS. 9 and 10). Additionally, the seed transport member 116' is configured to be rotated through various sections or regions of the associated seed meter 100, such as a post-delivery region 152, a seed acquisition region 154, and pre- and post-singulation regions 162, 164 (e.g., defined relative to an associated singulator 160).

Moreover, the seed transport member 116' also includes a plurality of seed cells 140 defined therein. However, as shown in FIG. 9, as opposed to including a single array of circumferentially spaced seed cells, the seed transport member 116' includes a pair of concentric, annular seed cell arrays. Specifically, as shown in the illustrated embodiment, the seed transport member 116' includes both a first annular seed cell array (e.g., indicated by dashed circle 141) and a second annular seed cell array (e.g., indicated by dashed circle 143), with the second cell array 143 being spaced radially outwardly from the first seed cell array 141. Each seed cell array 141, 143 includes a plurality of circumferentially spaced seed cells 140A, 140B. For example, as shown in FIG. 9, the first seed cell array 141 includes a plurality of circumferentially spaced first seed cells 140A and the second seed cell array 143 includes a plurality of circumferentially spaced second seed cells 140B.

It should be appreciated that the specific arrangement and number of seed cells 140 included within each seed cell array 141, 143 may generally vary depending on the desired configuration of the seed transport member 116' and/or the particular application in which it is being used. For example, in the illustrated embodiment, the seed transport member 116' is configured as a three-seed hill drop cotton disk. Specifically, as shown in FIG. 9, the first seed cell array 141 includes twice as many seed cells 140 as the second cell array 143, with a pair of the first seed cells 140A being arranged generally adjacent to each individual second seed cell 140B. In such an embodiment, each individual second seed cell 140B may be circumferentially aligned with one of the first seed cells 140A included within the adjacent pair of seed cells or each second seed cell 140B may be circumferentially offset from both of the first seed cells 140A of the adjacent pair of seed cells (e.g., as shown in FIGS. 9 and 10). However, in other embodiments, one or more aspects of the arrangement of the seed cell arrays 141, 143 may be varied, such as the number of seed cells 140 included within each array, the circumferential spacing between seed cells 140 of the same array, the circumferential spacing between seed cells 140 of the separate arrays, and/or the like.

Additionally, similar to the configuration described above with reference to FIG. 6, one or more sensors may be installed relative to the seed transport member 116' to detect one more parameters associated with the operation of the seed meter 100. For example, as shown in FIG. 9, a pair of seed pool sensors 102 may be installed relative to the seed transport member 116' to provide sensor data indicative of the presence or absence of seeds within one or more of the seed cells 140 passing through the seed acquisition region 154 of the seed meter 100, such as a first seed pool sensor 102A installed relative to the first seed cell array 141 to detect the presence or absence of seeds within the first seed cells 140A (e.g., at the associated detection zone 166A of the sensor 102A) and a second seed pool sensor 102B installed relative to the second seed cell array 143 to detect the presence or absence of seeds within the second seed cells 140B (e.g., at the associated detection zone 166B of the sensor 102B). Similarly, a pair of pre-singulation sensors 104 (e.g., a first pre-singulation sensor 104A and a second pre-singulation sensor 104B) may be installed relative to the seed transport member 116' to detect the presence or absence of seeds contained within the first and second seed cells 140A, 140B at locations immediately upstream of the singulator 160 (e.g., at detection zones 168A, 168B of the sensors 104A, 104B). Moreover, a pair of post-singulation sensors 106 (e.g., a first post-singulation sensor 106A and a second post-singulation sensor 106B) may be installed relative to the seed transport member 116' to detect the presence or absence of seeds contained within the first and second seed cells 140A, 140B at locations immediately downstream of the singulator 160 (e.g., at detection zones 170A, 170B of the sensors 106A, 106B). Further, a pair of post-delivery sensors (e.g., a first post-delivery sensor 108A and a second post-delivery sensor 108B) may be installed relative to the seed transport member 116' to detect each of the first and second seed cells 140A, 140B passing through the post-delivery region 152 of the seed meter 100 (e.g., at detection zones 172A, 172B of the sensors 108A, 108B). Of course, any other suitable sensor(s) may also be installed relative to the seed transport sensor 116', such as one or more position sensors 174 (e.g., the rotary encoder 176 shown in FIG. 9)

In the illustrated embodiment, the sensors included within each pair of associated sensors are positioned generally adjacent to each other, such as by having little or no circumferential offset between the sensors in combination to having relatively short radial distance defined between the sensors. For example, as particularly shown in FIG. 10, the sensors included within each pair of sensors may be circumferentially aligned with each other such that the seed cells 140 of the first and second seed cell arrays 141, 143 pass by the detection zones of the sensor pair at a common circumferential location. However, in other embodiments, the sensors of each sensor pair may be circumferentially offset by a relatively small or large degree.

It should be appreciated that, in other embodiments, any other suitable combination of sensors may be installed relative to the seed transport member 116' shown in FIGS. 9 and 10. For example, in one embodiment, the associated seed meter 100 may only include a sub-combination of the seed pool sensors 102, pre-singulation sensors 104, post-singulation sensors 106, and post-delivery sensors 108 described above. Additionally, as opposed to including a pair of each of the above-described sensor types (i.e., the seed pool sensors 102, pre-singulation sensors 104, post-singulation sensors 106, and post-delivery sensors 108), the seed meter 100 may only include a single sensor of one or more of the above-described sensor types, in which case the detection zone of such sensor may be aligned with only one of the seed cell arrays 141, 143. For instance, in embodiments in which it is desired to use a post-delivery sensor 108 as a timing sensor, a single post-delivery sensor 108 that has a detection zone aligned with either the first seed cell array 141 or the second seed cell array 143 may be configured to provide timing signals that allow for the associated controller 202 to sample and/or evaluate the sensor data provided from both the sensors associated with the same seed cell array as the post-delivery sensor 108 and the sensors associated with the other seed cell array given the known geometrical relationships between the seed cells 140A, 140B of the differing seed cell arrays 141, 43 (e.g., the circumferential offsets or spacing between the seed cells 140 of the two seed cell arrays 141, 143).

It should also be appreciated that, in embodiments in which the seed meter 100 includes pairs of adjacent optical sensors, the sensors may receive crosstalk from each other (e.g., when light emitted from one optical sensor is received by the other optical sensor) in the event that the sensors are activated at the same time, which can impact the accuracy of the sensor data received from one or both of the sensors. For example, sensor crosstalk can be particularly problematic when the detection zones of adjacent sensors partially overlap each other, thereby allowing light emitted from one sensor to be detected by the adjacent sensor. To address this issue, each sensor of a given pair of adjacent sensors can be activated for a signal instance or short time period in sequence, thereby avoiding crosstalk between the sensors. For example, in the close-up view of the portion of the seed transport member 116' shown in FIG. 10, the seed cells 140 of the first and second seed cell arrays 141, 143 are circumferentially offset from one another such that a downstream cell of the first seed cells 140A (labeled as "CELL #1" in FIG. 10) passes by the circumferential location of the pair of post-singulation sensors 106A, 106B immediately prior to an adjacent cell of the second seed cells 140B (labeled as "CELL #2" in FIG. 10) followed by an upstream cell of the first seed cells 140A (labeled as "CELL #3" in FIG. 10). In such an embodiment, the post-singulation sensors 106A, 106B may be sequentially activated/deactivated in the following order to avoid crosstalk between the sensors: 1) initially activate the first post-singulation sensor 106A to detect the presence or absence of a seed within the downstream seed cell of the first seed cells 140A (i.e., "CELL #1" in FIG. 10); 2) deactivate the first post-singulation sensor 106A; 3) activate the second post-singulation sensor 106B to detect the presence or absence of a seed within the adjacent second seed cell 140B (i.e., "CELL #2" in FIG. 10); 4) deactivate the second post-singulation sensor 106B; and 5) activate the first post-singulation sensor 106A to detect the presence or absence of a seed within the upstream seed cell of the first seed cells 140A (i.e., "CELL #3" in FIG. 10).

Such sequential activation of the sensors may be desirably achieved, for example, utilizing aspects of the system 200 described above with reference to FIG. 7, particularly the use of timing signals as a means to properly time the activation of the sensors. Specifically, as indicated above, the system controller 202 may be configured to utilize timing signals received from an associated timing sensor (e.g., a post-delivery sensor 108 and/or a position sensor 174) to determine when a given seed cell 140 will be passing by each relevant sensor. In such instance, referring to the example shown in FIG. 10, the controller 202 may, based on the timing signals, determine exactly when the first post-singulation sensor 106A will encounter both the first downstream seed cell (i.e., "CELL #1" in FIG. 10) and the first upstream seed cell (i.e., "CELL #3" in FIG. 10) and when the second post-singulation sensor 106B will encounter the adjacent second seed cell (i.e., "CELL #2" in FIG. 10). The controller 202 may then sequentially activate the sensors 106A, 106B at the appropriate instances to detect whether each passing seed cell contains a seed while avoiding the sensor crosstalk that would otherwise occur due to simultaneous activation of the sensors 106A, 106B.

It should be appreciated that, when implementing the sequential activation of a given pair of adjacent sensors, any of the timing techniques and/or methodologies described above with reference to FIG. 7 may be utilized. For example, a post-delivery sensor(s) 108 may be used to provide timing signals based on the detection of open seed cells 140 passing through the post-delivery region 152 of the seed meter. In addition to the post-delivery sensor(s) 108 (or as an alternative thereto), a position sensor 174 of the seed meter 100 may provide timing signals based on detecting the extent to which the seed transport member 116' has been rotated within the seed meter 100.

It should also be appreciated that the above-described sequential activation of a given pair of sensors may be particularly desirable in embodiments in which the sensors are in relatively close proximity to each other in both the radial and circumferential directions of the seed transport member (e.g., by being circumferentially aligned with each other, such as that shown in the embodiment of FIGS. 9 and 10, or by being circumferentially offset from each other by a relatively small degree with a small radial offset defined therebetween) in combination with a seed cell configuration for the seed transport member 116' in which the seed cells 140A, 140B from the separate seed cell arrays 141, 143 pass by the location of the pair of sensors within a very short time frame. For example, sequential activation of the sensors may be desirable when the sensors are positioned sufficiently proximal to each other such that the detection zones of the sensors at least partially overlap (e.g., as shown in the embodiment of FIG. 10), thereby providing the potential for crosstalk between the sensors. However, it should be appreciated that, in other embodiments, the sensors included within each sensor pair may be spaced sufficiently apart from each other so as to avoid any crosstalk issues, such as by ensuring that the detection zones of adjacent sensors do not overlap.

Figure 11:
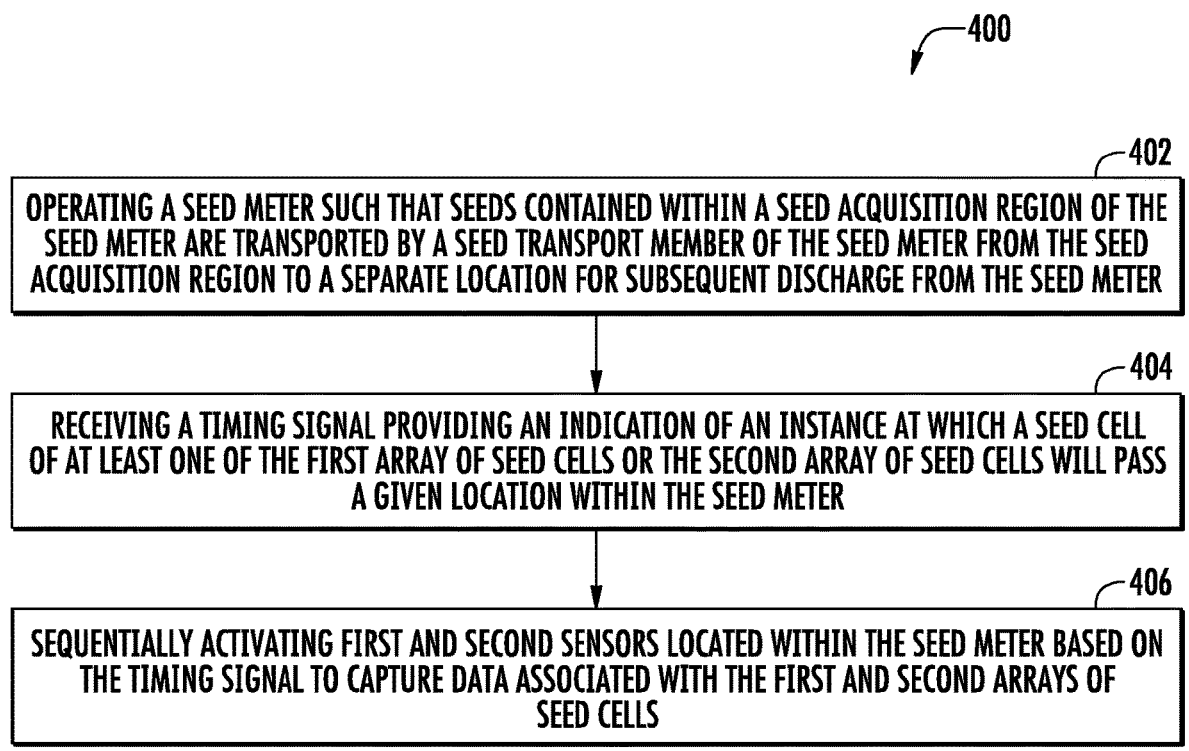
FIG. 11 illustrates a flow diagram of another embodiment of a method for monitoring the operation of a seed meter in accordance with aspects of the present subject matter.

Referring now to FIG. 11, a flow diagram of one embodiment of a method 400 for monitoring the operation of a seed meter is illustrated in accordance with aspects of the present subject matter. In general, the method 400 will be described herein with reference to the system 200 described above with reference to FIG. 7 and the configuration of the seed transport member 116' described above with reference to FIGS. 9 and 10. However, it should be appreciated by those of ordinary skill in the art that the disclosed method 300 may be implemented within any other system and/or with any other suitable seed transport member having any other suitable configuration. In addition, although FIG. 11 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 11, at (402), the method 400 includes operating a seed meter such that seeds contained within a seed acquisition region of the seed meter are transported by a seed transport member of the seed meter from the seed acquisition region to a separate location for subsequent discharge from the seed meter. For example, as indicated above, the seed transport member 116' may be configured to be rotated within the seed meter 100 such that seeds are collected by the seed cells 140A, 140B of the seed transport member 116 within the seed acquisition region 154 and carried to the distal end 150 of the vacuum chamber 126, at which point the seeds drop from the seed transport member 116' and are discharged from the seed meter 100.

Additionally, at (404), the method 400 includes receiving a timing signal providing an indication of an instance at which a seed cell of at least one of the first array of seed cells or the second array of seed cells will pass a given location within the seed meter. For example, as indicated above, the controller 202 may be configured to receive a timing signal from an associated "timing sensor" (e.g., a post-delivery sensor 108 and/or a position sensor 174 that provides an indication of the instance at which the seed cells 140A, 140B of the seed transport member 116' are passing a given location with the seed meter (e.g., the location of the timing sensor).

Moreover, at (406), the method 400 includes sequentially activating first and second sensors located within the seed meter based on the timing signal to capture data associated with the first and second arrays of seed cells. For example, as indicated above with reference to FIGS. 9 and 10, one or more pairs of adjacent sensors 102, 104, 106, 108 may be installed relative to the seed transport member 116' to capture data associated with the first and second seed cell arrays 141, 143 (e.g., the presence or absence of seeds within the seed cells 140A, 140B of each array 141, 143). In such an embodiment, the controller 202 may be configured to sequentially activate the sensors of the sensor pair to avoid any crosstalk issues. For example, the controller 202 may be configured to temporarily activate a first sensor of the sensor pair to sample data therefrom at a first instance at which a seed cell of the first seed cell array is passing by the location of the sensor and thereafter temporarily activate a second sensor of the sensor pair to sample data therefrom at a second instance at which a seed cell of the second seed cell array is passing by the location of the sensor. In such an embodiment, the second instance may occur after first instance such that the first sensor is no longer activated at the second instance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for monitoring seed meter operation, the method comprising:
    operating a seed meter such that seeds contained within a seed acquisition region of the seed meter are transported by a seed transport member of the seed meter from the seed acquisition region to a separate location for subsequent discharge from the seed meter;
    receiving, with a computing device, an index signal from a sensor located within a portion of the seed meter across which an air pressure differential exists to allow seeds to be transported by the seed transport member, the index signal providing an indication of a current position of one or more seed cells of the seed transport member relative to the sensor;
    receiving, with the computing device, a timing signal associated with an extent to which the seed transport member has been rotated within the seed meter following receipt of the index signal; and
    evaluating, with the computing device, data from the sensor based on the timing signal to identify at least one of the presence or absence of a seed within the one or more seed cells of the seed transport member.

2. The method of claim 1, wherein receiving the timing signal comprises receiving the timing signal from a timing sensor configured to detect the extent to which the seed transport member has been rotated within the seed meter.

3. The method of claim 2, wherein the timing sensor comprises one of a rotary encoder or an analog rotary position sensor.

4. The method of claim 2, wherein the timing sensor comprises a sensor configured to detect at least one of a surface feature or a physical feature of the seed transport member or a feature of a shaft rotationally driving the seed transport member.

5. The method of claim 1, wherein the sensor comprises one of a seed pool sensor, a pre-singulation sensor, or a post-singulation sensor, the index signal being received when a first seed cell of the seed transport member passes through a detection zone of the sensor.

6. The method of claim 5, wherein evaluating the data from the sensor based on the timing signal comprises:
   determining an instance at which a second seed cell of the seed transport member will pass through the detection zone of the sensor based on the timing signal; and
   analyzing the data received from the sensor at the instance the second seed cell passes through the detection zone to identify the at least one of the presence or absence of a seed within the second seed cell.

7. The method of claim 1, wherein the computing device stores an offset value within memory that is associated with a predetermined amount of rotation of the seed transport member between instances at which the one or more seed cells pass through a detection zone of the sensor.

8. The method of claim 7, wherein evaluating the data from the sensor based on the timing signal comprises:
   monitoring the extent to which the seed transport member has been rotated within the seed meter based on the timing signal; and
   temporarily analyzing the data received from the sensor at each instance at which a determination is made that the seed transport member has rotated the predetermined amount of rotation following a previous instance at which the data was temporarily analyzed.

9. A method for monitoring seed meter operation, the method comprising:
   operating a seed meter such that seeds contained within a seed acquisition region of the seed meter are transported by a seed transport member of the seed meter from the seed acquisition region to a separate location for subsequent discharge from the seed meter, the seed transport member defining a first array of seed cells and a second array of seed cells spaced radially from the first array of seed cells;
   receiving, with a computing device, a timing signal providing an indication of an instance at which a seed cell of at least one of the first array of seed cells or the second array of seed cells will pass a given location within the seed meter;
   sequentially activating, with the computing device, first and second sensors located within the seed meter based on the timing signal to capture data associated with the first and second arrays of seed cells, the first sensor being configured to detect at least one of the presence or absence of seeds within the first array of seed cells and the second sensor being configured to detect at least one of the presence or absence of seeds within the second array of seed cells.

10. The method of claim 9, wherein sequentially activating the first and second sensors comprises:
   temporarily activating the first sensor to sample data therefrom at a first instance as a first seed cell of the first seed cell array passes by the first sensor within the seed meter; and
   temporarily activating the second sensor to sample data therefrom at a second instance as a second seed cell of the second seed cell array passes by the second sensor within the seed meter.

11. The method of claim 10, wherein the second instance occurs after the first instance such that the first sensor is no longer activated at the second instance.

12. The method of claim 9, wherein receiving the timing signal comprises receiving sensor data associated with an extent to which the seed transport member has been rotated within the seed meter.

13. The method of claim 9, wherein receiving the timing signal comprises receiving sensor data from a separate sensor configured to detect the instance at which the seed cell of the at least one of the first array of seed cells or the second array of seed cells passes a location of the separate sensor within the seed meter.

14. The method of claim 9, wherein the first and second sensors comprise optical sensors.

15. The method of claim 14, wherein the first and second sensors are positioned sufficiently proximal to each other within the seed meter such that light emitted from the first sensor is detectable by the second sensor.

16. The method of claim 15, wherein sequentially activating the first and second sensors comprises activating the first sensor at a different time than the second sensor to avoid crosstalk between the first and second sensors.

17. The method of claim 9, wherein the first and second sensors are positioned relative to each other such that a detection zone of the first sensor at least partially overlaps a detection zone of the second sensor.

18. A system for monitoring seed meter operation, the system comprising:
   a seed meter including a seed transport member configured to transport seeds contained within the seed meter from a seed acquisition region of the seed meter to a separate location for subsequent discharge from the seed meter, the seed transport member defining a first array of seed cells and a second array of seed cells spaced radially from the first array of seed cells;
   a first sensor having a detection zone through which at least one of seed cells of the first array of seed cells or seeds carried by the seed cells of the first array of seed cells pass with rotation of the seed transport member, the first sensor being configured to detect the presence or absence of seeds within the seed cells of the first array of seed cells;
   a second sensor having a detection zone through which at least one of seed cells of the second array of seed cells or seeds carried by the seed cells of the second array of seed cells pass with rotation of the seed transport member, the second sensor being configured to detect the presence or absence of seeds within the seed cells of the second array of seed cells; and
   a controller communicatively coupled to the first and second sensors, the controller being configured to sequentially activate the first and second sensors to collect data associated with the presence or absence of seeds within the seed cells of the first and second arrays of seed cells.

19. The system of claim 18, wherein the first and second sensors comprise optical sensors, the first and second sensors being positioned sufficiently proximal to each other within the seed meter such that light emitted from the first sensor is detectable by the second sensor.

20. The system of claim 18, wherein the controller is configured to both temporarily activate the first sensor to sample data therefrom at a first instance as a first seed cell of the first seed cell array passes by the first sensor within the seed meter and temporarily activate the second sensor to sample data therefrom at a second instance as a second seed cell of the second seed cell array passes by the second sensor within the seed meter, the second instance occurring after the first instance such that the first sensor is no longer activated at the second instance.

* * * * *